(12) United States Patent
Baek et al.

(10) Patent No.: US 11,568,018 B2
(45) Date of Patent: Jan. 31, 2023

(54) UTILIZING MACHINE-LEARNING MODELS TO GENERATE IDENTIFIER EMBEDDINGS AND DETERMINE DIGITAL CONNECTIONS BETWEEN DIGITAL CONTENT ITEMS

(71) Applicant: Dropbox, Inc., San Francisco, CA (US)

(72) Inventors: Jongmin Baek, Foster City, CA (US); Jiarui Ding, Foster City, CA (US); Ermo Wei, San Bruno, CA (US); Scott McCrae, Mill Valley, CA (US)

(73) Assignee: Dropbox, Inc., San Francisco, CA (US)

( * ) Notice: Subject to any disclaimer, the term of this patent is extended or adjusted under 35 U.S.C. 154(b) by 245 days.

(21) Appl. No.: 17/131,488

(22) Filed: Dec. 22, 2020

(65) Prior Publication Data

US 2022/0197961 A1    Jun. 23, 2022

(51) Int. Cl.
*G06F 16/958* (2019.01)
*G06N 20/00* (2019.01)
(Continued)

(52) U.S. Cl.
CPC .......... *G06F 16/958* (2019.01); *G06F 40/284* (2020.01); *G06N 3/0454* (2013.01); *G06N 20/00* (2019.01)

(58) Field of Classification Search
CPC .... G06N 20/00; G06N 3/0454; G06F 16/958; G06F 40/284; G06F 40/30
See application file for complete search history.

(56) References Cited

U.S. PATENT DOCUMENTS 8,489,599 B2   7/2013   Bellotti
9,535,897 B2   1/2017   Anderson et al.
(Continued)

FOREIGN PATENT DOCUMENTS

CN        111460100 A        7/2020

OTHER PUBLICATIONS

Non-Final Office Action from U.S. Appl. No. 17/065,266, dated Jun. 15, 2022, 14 pages.
(Continued)

*Primary Examiner* — Etienne P Leroux
(74) *Attorney, Agent, or Firm* — Keller Preece PLLC

(57) ABSTRACT

The present disclosure relates to systems, methods, and non-transitory computer-readable media that utilize machine learning models to generate identifier embeddings from digital content identifiers and then leverage these identifier embeddings to determine digital connections between digital content items. In particular, the disclosed systems can utilize an embedding machine-learning model that comprises a character-level embedding machine-learning model and a word-level embedding machine-learning model. For example, the disclosed systems can combine a character embedding from the character-level embedding machine-learning model and a token embedding from the word-level embedding machine-learning model. The disclosed systems can determine digital connections between the plurality of digital content items by processing these identifier embeddings for a plurality of digital content items utilizing a content management model. Based on the digital connections, the disclosed systems can surface one or more digital content suggestions to a user interface of a client device.

20 Claims, 19 Drawing Sheets

(51) Int. Cl.
*G06N 3/04* (2006.01)
*G06F 40/284* (2020.01)

(56) References Cited

U.S. PATENT DOCUMENTS

| | | |
|---|---|---|
| 10,062,039 B1 | 8/2018 | Lockett |
| 10,496,924 B1 | 12/2019 | Highnam et al. |
| 10,614,113 B2 | 4/2020 | Peled et al. |
| 10,769,381 B2 | 9/2020 | Tacchi et al. |
| 10,803,380 B2 | 10/2020 | Dai et al. |
| 11,442,976 B1 * | 9/2022 | LaBute ............... G06F 16/338 |
| 2004/0154000 A1 | 8/2004 | Kasravi et al. |
| 2007/0299713 A1 | 12/2007 | Macbeth et al. |
| 2012/0041955 A1 | 2/2012 | Regev et al. |
| 2019/0163671 A1 | 5/2019 | Vengerov et al. |
| 2020/0311543 A1 | 10/2020 | Jamali et al. |
| 2020/0320388 A1 | 10/2020 | Lyske et al. |
| 2020/0380470 A1 * | 12/2020 | Wakankar ........... G06Q 10/1053 |

OTHER PUBLICATIONS

Devlin J., et al., "Pre-Training of Deep Bidirectional Transformers for Language Understanding," 2018, retrieved from https://arxiv.org/abs/1810.04805v2 on May 24, 2019, 16 pages.

Jurafsky D., et al., "N-gram Language Models," Oct. 2, 2019, 28 pages.

Mikolov T., "Distributed Representations of Words and Phrases and their Compositionality," 2013, Advances in Neural Information Processing Systems, pp. 1-9.

Pennington J., et al., "GloVe: Global Vectors for Word Representation," Oct. 2014, Proceedings of the 2014 Conference on Empirical Methods in Natural Language Processing, pp. 1532-1543.

Zhao L., "Event Prediction in the Big Data Era: A Systematic Survey," Aug. 4, 2020, 40 pages.

BTH, "Email Classification with Machine Learning and Word Embeddings for Improved Customer Support," 2017, 65 pages.

* cited by examiner

UTILIZING MACHINE-LEARNING MODELS TO GENERATE IDENTIFIER EMBEDDINGS AND DETERMINE DIGITAL CONNECTIONS BETWEEN DIGITAL CONTENT ITEMS

BACKGROUND

Recent years have seen significant improvements in computer systems that implement relational models for comparing and identifying digital content. For example, conventional systems have applied relational models in a variety of different applications to recommend digital content to client devices across computer networks. For example, some conventional systems utilize relational models to analyze contents of digital content items to generate digital suggestions for client devices. Although these conventional systems can utilize relational models to generate digital content suggestions, they have a number of technical shortcomings, particularly with regard to accuracy, efficiency, and flexibility of implementing computing systems.

For example, conventional systems often generate inaccurate predictions with respect to related digital content. Indeed, most conventional relation systems are unable to accurately analyze digital content to determine digital relationships between digital content items within a content management system. Specifically, conventional relation systems are often unable to extract sufficient contextual information to generate accurate predictions. In turn, without sufficient context, the conventional relation systems often provide inapplicable suggested content or recommendations to users based on an inaccurate predictions of related digital content.

With inaccurate relation predictions perpetuating inaccurate or inapplicable suggested content, conventional relation systems are also prone to waste computing resources. For example, conventional relation systems expend significant computing resources and system bandwidth in generating, transmitting, and surfacing inaccurate suggestions or recommendations to client devices. In addition, because of these inaccurate suggestions, conventional systems also often require significant user interactions to locate and identify desired digital content. Indeed, conventional systems often require dozens of user interactions (and significant corresponding computing resources) to identify and provide a particular digital content item within a large, complex file architecture.

In addition, conventional relation systems are often rigid and inflexible. For example, many conventional systems utilize models that are tied to a specific and fixed data structure. To illustrate, some conventional systems can analyze historical user selections and generate digital content predictions utilizing these specific historical selections. This rigid approach, however, fails to analyze the wide variety of available information for extracting context in determining pertinent digital content items. This rigidity only exacerbates the accuracy and efficiency problems outlined above.

BRIEF SUMMARY

Embodiments of the present disclosure provide benefits and/or solve one or more of the foregoing or other problems in the art with systems, non-transitory computer-readable media, and methods that utilize machine-learning models to generate identifier embeddings from digital content identifiers and then leverage these identifier embeddings to determine digital connections between digital content items. To illustrate, the disclosed systems can train an embedding machine-learning model to process file name identifiers and generate identifier embeddings that encode contextual information regarding the file. For instance, the disclosed systems can train an embedding machine-learning model that includes both a character-level embedding machine-learning model and a word-level embedding machine-learning model that processes identifiers at different levels of specificity to generate identifier embeddings that reflect relational features between digital content items. To illustrate, in one or more embodiments, the disclosed systems train the embedding machine-learning model by predicting file relations between digital content items (e.g., sibling or parent-child file relations) and then utilizing ground truth file relations to modify internal parameters of the embedding machine-learning model. In this manner, the disclosed systems can efficiently train embedding machine-learning models to accurately generate identifier embeddings that reflect relational information between digital content items.

Upon training an embedding machine-learning model, the disclosed systems can flexibly utilize the embedding machine-learning model to generate identifier embeddings and determine digital connections between digital content items. For example, the disclosed systems can process a context identifier and a target identifier utilizing a trained embedding machine-learning model to generate a context embedding and a target embedding. The disclosed systems can then utilize a content management model to process the context embedding and the target embedding (together with any other pertinent contextual information or embeddings) to determine a digital connection between the digital content items and generate digital suggestions. In this manner, the disclosed systems can efficiently and flexibly determine digital connections between digital content items and provide accurate digital suggestions to client devices across computer networks.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
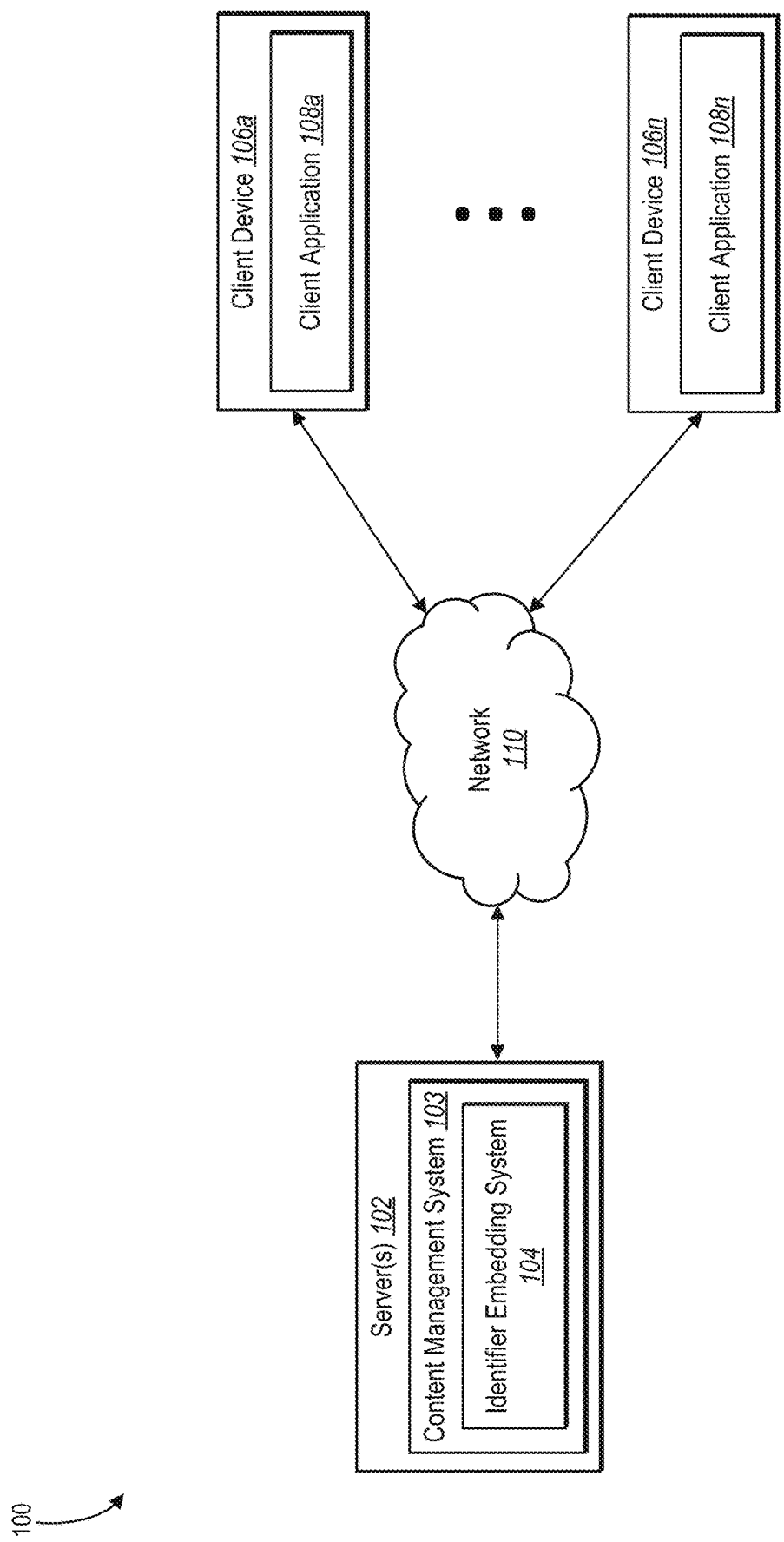
FIG. 1 illustrates a diagram of a computing system environment including an identifier embedding system in accordance with one or more embodiments.

One or more embodiments of the present disclosure relate to an identifier embedding system that utilizes machine-learning models to generate identifier embeddings from digital content identifiers and then process these identifier embeddings to determine digital connections between digital content items. To capture contextual informational signals within an identifier, the identifier embedding system can generate identifier embeddings utilizing a trained, dual-branched embedding machine-learning model. In particular, the identifier embedding system can utilize a character-level embedding machine-learning model (e.g., a first branch of the embedding machine-learning model) to process individual characters within the identifier to generate a character embedding. Moreover, the identifier embedding system can generate multi-character tokens by applying lexical rules to the identifier and then utilize a word-level embedding machine-learning model (e.g., a second branch of the embedding machine-learning model) to process the multi-character tokens and generate a token embedding. The identifier embedding system can combine the character-level embedding and the token embedding to generate an identifier embedding reflecting overall relational features of a digital content item. Moreover, the identifier embedding system can process this combined identifier embedding (e.g., together with other embeddings or contextual information) utilizing a content management model to determine digital connections between digital content items.

As just mentioned, the identifier embedding system can utilize a trained embedding machine-learning model to extract relational features from digital content identifiers. In one or more embodiments, the identifier embedding system trains the embedding machine-learning model to generate these identifier embeddings. For example, to train the embedding machine-learning model the identifier embedding system can generate training identifier embeddings using the embedding machine-learning model. To illustrate, the character-level embedding machine-learning model can generate a training character embedding by processing an identifier utilizing a character encoder, an embedding layer, and a recurrent neural network. Similarly, the word-level embedding machine-learning model can generate a training token embedding by separately processing the identifier utilizing a token generator, an embedding layer, and a recurrent neural network. The identifier embedding system can combine the training character embedding and the training token embedding to generate the training identifier.

The identifier embedding system can train the embedding machine learning model by processing the training identifier utilizing a trained machine-learning model. Specifically, the identifier embedding system can process a pair of training identifiers (corresponding to a pair of digital content items) utilizing the trained machine-learning model to generate a digital similarity prediction between the pair of digital content items. The identifier embedding system can then compare the digital similarity prediction with a ground truth similarity metric to train the embedding machine learning model. For example, the identifier embedding system can apply a loss function to the digital similarity prediction and the ground truth similarity metric and then modify parameters of the embedding machine-learning model to reduce a measure of loss from the loss function. For example, the identifier embedding system may update parameters for the character-level embedding machine-learning model and the word-level embedding machine-learning model.

The trained machine-learning model utilized to generate the digital similarity prediction can include one or more of a variety of machine-learning models that generates a similarity prediction between digital content items. For example, in some embodiments, the trained machine-learning model is a file relation machine-learning model that processes a plurality of identifier embeddings utilizing one or more fully connected neural network layers to generate a file relation prediction. For example, the trained machine-learning model can generate a prediction that a pair of digital content items have a sibling relation or a parent-child relation. The identifier embedding system can compare this prediction with a ground truth file relation (e.g., whether the pair of digital content items are actually sibling files within the same file folder or whether the pair of digital content items have a parent-child relationship within a file structure). Based on this comparison, the disclosed systems can learn parameters of the embedding machine-learning model.

In other embodiments, the trained machine-learning model can generate a prediction that a pair of digital content items have other types of relationships. For example, the identifier embedding system can generate predictions regarding access patterns (e.g., concurrent or near-concurrent shared access), access privileges, or a file destination. By comparing these and/or other types of predictions with ground truth data, the disclosed systems can subsequently learn corresponding parameters of the embedding machine-learning model.

Upon training the embedding machine-learning model, the identifier embedding system can use the embedding machine-learning model to generate identifier embeddings. Indeed, the identifier embedding system can apply the embedding machine-learning model to a plurality of digital content identifiers and generate a plurality of identifier embeddings. For example, the identifier embedding system can generate identifier embeddings for filenames, folder names, or workspace names to utilize in determining connections with other digital content items.

For instance, the identifier embedding system can determine digital connections between digital content items based on the identifier embeddings by utilizing a content management model. To illustrate, the identifier embeddings can detect user activity with respect to a digital content item. In response to detecting the user activity, the identifier embedding system can process an identifier embedding for the digital content item and one or more other digital content items (e.g., recently accessed files). By processing these identifier embeddings utilizing the content management model, the identifier embedding system can predict a digital connection between digital content items.

Based on the predicted digital connections between digital content items, the identifier embedding system can generate one or more suggestions, predictions and/or classifications. For example, based on predicted digital connection scores, the content management model may surface a suggestion relating to the digital content item (or other digital content items). For instance, the identifier embedding system may suggest that a user account access or share the digital content item. In this manner, the identifier embedding system can assist in efficiently and accurately identifying related digital content items across client devices.

As mentioned above, the identifier embedding system can provide several advantages over conventional systems, particularly with regard to accuracy, efficiency, and flexibility of implementing computer devices.

For example, the identifier embedding system can increase accuracy of predictions relative to conventional systems. Indeed, the identifier embedding system can train and utilize an embedding machine learning model that more accurately generates embeddings to capture contextual information from digital content identifiers. To illustrate, by utilizing a character-level embedding machine-learning model and/or a word-level embedding machine-learning model, the identifier embedding system can better extract pertinent informational signals from digital content identifiers. Moreover, by training an embedding machine learning model utilizing ground truth file relations (or other similarity ground truths), the identifier embedding system can generate identifier embeddings that accurately reflect relational information between digital content items. With the identifier embeddings better representing informational signals within an identifier, the identifier embedding system can better identify digital connections between digital content items for generating corresponding suggestions, predictions, and/or classifications.

Natural language processing models could also be utilized to generate embeddings representing digital content identifiers. However, one or more embodiments of the present disclosure outperform even natural language processing models. That is, natural language processing models are designed for processing text in a linguistics format typically used in human speech or written communication. However, identifiers such as filenames often include unique (e.g., company internal) naming conventions, non-spaced words, numerous dates or numbers in a variety of formats, and myriad suffixes and prefixes. Accordingly, relative to the embedding machine-learning model described herein, natural language processing models would fail to accurately represent such oddities of identifiers.

Further to improved accuracy, the identifier embedding system can also improve efficiency relative to conventional systems. In particular, the identifier embedding system can reduce computing resource consumption (e.g., system bandwidth) by transmitting and/or surfacing accurate and relevant suggestions to user accounts. Indeed, by determining digital connections between digital content items based on identifier embeddings, the identifier embedding system can generate more accurate, relevant suggestions and reduce user interactions and corresponding computational resources in identifying and providing digital content items. To illustrate, upon receiving a selection from a client device of a first digital content item, the disclosed systems can utilize machine learning models and identifier embeddings to generate a digital suggestion that includes a related digital content item. The client device can then directly select the related digital content item, avoiding numerous user interactions, user interfaces, and computer resources needed by conventional systems to search for and identify the related digital content item.

As mentioned, the identifier embedding system can also improve flexibility relative to conventional systems. Indeed, the identifier embedding system can flexibly use identifiers of digital content items to help a content management model identify digital connections between digital content items. As an initial matter, the identifier embedding system can flexibly train an embedding machine-learning model by leveraging information from within a content management system. Indeed, as described above, the identifier embedding system can leverage training data (e.g., file relations or other ground truth similarity metrics) that the identifier embedding system can automatically obtain from a repository of user accounts. Utilizing this training data and the unique training approach discussed above, the embedding machine learning model can flexibly train machine learning models to generate identifier embeddings with available digital data.

In addition to this improved training flexibility, the identifier embedding system can also flexibly generate digital suggestions, classifications, or predictions. First, the identifier embedding system can flexibly analyze identifiers at a variety of levels of specificity (e.g., utilizing character embeddings and/or token embeddings) in generating identifier embeddings. Moreover, the identifier embedding system can utilize identifier embeddings together with a variety of other embeddings or contextual information to determine digital connections between digital content items. For example, the identifier embedding system can utilize a content management machine learning model to process identifier embeddings together with file extension embeddings, user activity embeddings, context data embeddings, or other available contextual information to flexibly generate classifications, predictions, or suggestions.

As illustrated by the above discussion, the present disclosure utilizes a variety of terms to describe features and advantages of the identifier embedding system. Additional detail is now provided regarding the meaning of some of these terms. For instance, as used herein, the term "identifier" refers to a name, tag, title, or other identifying element of a digital content item. Examples of an identifier can include a filename, folder name, workspace name, etc.

Relatedly, the term "identifier embedding" refers to a numerical representation (e.g., a feature vector) of an identifier for a digital content item. In particular, an identifier embedding can include a character embedding and/or a token embedding. For example, an identifier embedding can include a combination (e.g., concatenation, average, etc.) of both a character embedding and a token embedding.

As referred to herein, the term "character embedding" refers to a numerical representation (e.g., a feature vector) of individual characters (e.g., values or elements) of an identifier. For example, a character embedding can include one or more feature vectors that numerically represent characters and/or aspects of characters in isolation, such as digits, alphabetic characters, symbols, accents, delimiters, character casing, end markers, etc.

Similarly, as used herein, the term "token embedding" refers to a numerical representation (e.g., feature vector) of a token. For example, a token embedding can include one or more feature vectors based on tokens that correspond to an identifier. Relatedly, as used herein, the term "token" refers to a combination of multiple (two or more) characters. In particular, a token can represent a group of characters in an identifier (e.g., where each token represents a word, timestamp, date, etc.).

As further used herein, the term "digital content item" refers to a collection of digital data, such as a digital file, in a computing system environment. For example, a digital content item can include files, folders, workspaces (e.g., a directory of folders and/or files on a memory/storage device accessible by one or more user accounts over a network), placeholder files, collaborative content items, and the like. For example, a digital content item can include documents, shared files, individual or team (e.g., shared) workspaces, text files (e.g., PDF files, word processing files), audio files, image files, video files, template files, webpages, executable files, binaries, zip files, playlists, albums, email communications, instant messaging communications, social media posts, calendar items, etc.

In addition, as used herein, the term "digital connection" refers to a digital relationship, association, or correlation between digital content items. For example, a digital connection between digital content items can include a measure of similarity between digital content items. To illustrate, a digital connection can include an organizational similarity, a content-based similarity, a correlation based on user activity, an association based on access privileges, etc. that indicates a level of relatedness between digital content items.

Additionally, as used herein, the term "suggestion" refers to a user interface element, prompt, recommendation, call to action, or request in relation to a digital content item. In particular, a suggestion may include a surfacing a user interface element, prompt, recommendation, call to action, or requests based on a digital connection between digital content items. For example, a suggestion may include a suggested team workspace (e.g., a recommended directory of folders and/or files on a memory/storage device accessible by multiple user accounts over a network). As additional examples, a suggestion may include a suggested digital content item (e.g., a recommended text file to open) or a suggested access privilege (e.g., a recommended privilege for a user account to view and/or edit a digital content item).

As used herein, the term "machine-learning model" refers to a computer model or computer representation that can be tuned (e.g., trained) based on inputs to approximate unknown functions. For example, a machine-learning model may include one or more of a decision tree (e.g., a gradient boosted decision tree), a linear regression model, a logistic regression model, association rule learning, inductive logic programming, support vector learning, a Bayesian network, a regression-based model, principal component analysis, a neural network, or a combination thereof.

As used herein, the term "neural network" refers to one example of a machine learning model that can be tuned (e.g., trained) based on inputs to approximate unknown functions. In particular, a neural network can include a model of interconnected neurons (arranged in layers) that communicate and learn to approximate complex functions and generate outputs based on a plurality of inputs provided to the model. For example, a neural network includes deep convolutional neural networks, fully convolutional neural networks, or recurrent neural networks ("RNNs") such as long short-term memory neural networks ("LSTMs"). In other words, a neural network is an algorithm that implements deep learning techniques that utilize a set of learned parameters arranged in layers according to a particular architecture to attempt to model high-level abstractions in data.

Accordingly, the term "embedding machine-learning model" refers to a machine-learning model trained to generate one or more embeddings. In particular, an embedding machine-learning model can include a character-level embedding machine-learning model (e.g., one or more machine-learning models that generate a character embedding for an identifier). Additionally or alternatively, an embedding machine-learning model can include a word-level embedding machine-learning model (e.g., one or more machine-learning models that generate a token embedding for an identifier). Based on one or both of the character-level embedding machine-learning model and the word-level embedding machine-learning model, the embedding machine-learning model can generate an identifier embedding.

Similarly, the term "content management model" refers to a machine-learning model or a comparison model for determining a digital connection between digital content items. In particular, a content management model may include one or more machine-learning models that determine digital connections based on one or more of an identifier embedding, a user activity embedding, a file extension embedding, etc. For example, a content management model may include a machine-learning model trained to identify digital connections and correspondingly provide one or more suggestions (e.g., a suggested destination) with respect to digital content item(s). Alternatively, as a comparison model, the content management model may determine digital connections using similarity algorithms such as cosine similarity.

As mentioned above, in some embodiments the identifier embedding system utilizes a machine-learning model (e.g., a trained machine learning model or similarity prediction machine-learning model) to predict a measure of similarity between embeddings. In particular, a trained machine-learning model include a convolutional neural network that generates digital similarity predictions between two digital content items. In some embodiments, the embedding similarity machine-learning model can generate file relation predictions as the measure of similarity between embeddings. The identifier embedding system can train embedding machine learning models by comparing these predictions against ground truth similarity metrics.

As used herein, the term "digital similarity prediction" refers to an estimation of a type or degree of similarity between digital content items (e.g., a probability that two digital content items are related). For example, a digital similarity prediction may include a file relation prediction.

The term "file relation prediction" refers to a prediction indicative of how digital content items are structurally organized or stored relative to each other within a content management system. For example, a file relation prediction may include a parent-child file relation prediction. To illustrate, a parent-child file relation prediction includes a prediction that indicates a probability that a first digital content item is a parent file relative to a second digital content item (e.g., the first digital content item is a file that stores or includes the second digital content item) or that the first digital content item is a child file (e.g., the first digital content item is stored or included within the second digital content item)). As another example, a file relation prediction may include a sibling file relation prediction (e.g., a prediction that indicates a probability that a first and second digital content item are stored in a common folder or workspace).

Additional detail will now be provided regarding the identifier embedding system in relation to illustrative figures portraying example embodiments and implementations of the identifier embedding system. For example, FIG. 1 illustrates a computing system environment (or "environment") 100 for implementing an identifier embedding system 104 in accordance with one or more embodiments. As shown in FIG. 1, the environment 100 includes server(s) 102, client devices 106a-106n (collectively, client devices 106), and a network 110. Each of the components of the environment 100 can communicate via the network 110, and the network 110 may be any suitable network over which computing devices can communicate. Example networks are discussed in more detail below in relation to FIGS. 11-12.

As shown in FIG. 1, the environment 100 includes the client devices 106. The client devices 106 can be one of a variety of computing devices, including a smartphone, tablet, smart television, desktop computer, laptop computer, virtual reality device, augmented reality device, or other computing device as described in relation to FIG. 11. Although FIG. 1 illustrates multiple client devices 106, in some embodiments the environment 100 can include just one of the client devices 106. The client devices 106 can further communicate with the server(s) 102 via the network 110. For example, the client devices 106 can receive user input and provide information pertaining to the user input to the server(s) 102.

As shown, the client devices 106a-106n include a corresponding client application 108a-108n (collectively, client applications 108). In particular, the client applications 108 may be a web application, a native application installed on the client devices 106 (e.g., a mobile application, a desktop application, etc.), or a cloud-based application where part of the functionality is performed by the server(s) 102. The client applications 108 can present or display information to respective users associated with the client devices 106, including information or content responsive to detected user activity. In addition, the respective users can interact with the client applications 108 to provide user input to, for example, view, annotate, edit, send, or share a digital content item.

In these or other embodiments, the client applications 108 and/or the client devices 106 can correspond to specific user accounts (and in some cases, group(s) of user accounts). As used herein, the term "user account" refers to an arrangement in which a user is given personalized access to a computer, website, and/or application. For example, a user account may include privileges, controls, tools, and/or permissions associated with using a business account, an enterprise account, a personal account, or any other suitable type of account. Through a user account of a content management system 103 for instance, the identifier embedding system 104 can monitor and track user activity on the client devices 106 and/or the client applications 108.

As illustrated in FIG. 1, the environment 100 includes the server(s) 102. In some embodiments, the server(s) 102 comprises a content server and/or a data collection server. The server(s) 102 can also comprise an application server, a communication server, a web-hosting server, a social networking server, or a digital content management server. In particular, the server(s) 102 may learn, generate, store, receive, and transmit electronic data, such as executable instructions for identifying a plurality of identifiers, generating a plurality of identifier embeddings for each identifier of the plurality of identifiers, and determining a digital connection between a subset of digital contents items.

For example, the server(s) 102 may detect user activity with respect to a first digital content item. In response to detecting the user activity with respect to the first digital content item, the identifier embedding system 104 may identify a first identifier embedding for the first digital content item and a second identifier embedding for a second identifier (e.g., embeddings generated utilizing a trained embedding machine-learning model). Based on the first and second identifier embeddings, the server(s) 102 can use a content management model to determine digital connections between the first and second digital content items. In turn, the server(s) 102 can provide, for display within a user interface of the client applications 108 on the client devices 106, one or more suggestions based on the digital connections.

Although FIG. 1 depicts the identifier embedding system 104 located on the server(s) 102, in some embodiments, the identifier embedding system 104 may be implemented by one or more other components of the environment 100 (e.g., by being located entirely or in part at one or more of the other components). For example, identifier embedding system 104 may be implemented by the client devices 106 and/or a third-party device.

As shown in FIG. 1, the identifier embedding system 104 is implemented as part of a content management system 103 located on the server(s) 102. The content management system 103 can organize, manage, and/or execute tasks associated with user accounts, cloud storage, file synchronization, data security/encryption, smart workspaces, etc. For example, the client devices 106 can access respective user accounts associated with the content management system 103 via the client applications 108 to perform user activity with respect to various types of digital content items. In at least one embodiment, the content management system 103 organizes digital content items and stores changes made to the digital content items in response to various user activity. Additional details with respect to the content management system 103 are provided below with reference to FIG. 12.

In some embodiments, though not illustrated in FIG. 1, the environment 100 may have a different arrangement of components and/or may have a different number or set of components altogether. For example, the environment 100 may include a third-party server (e.g., for storing identifier embeddings). As another example, the client devices 106 may communicate directly with the identifier embedding system 104, thereby bypassing the network 110.

Figure 2A:
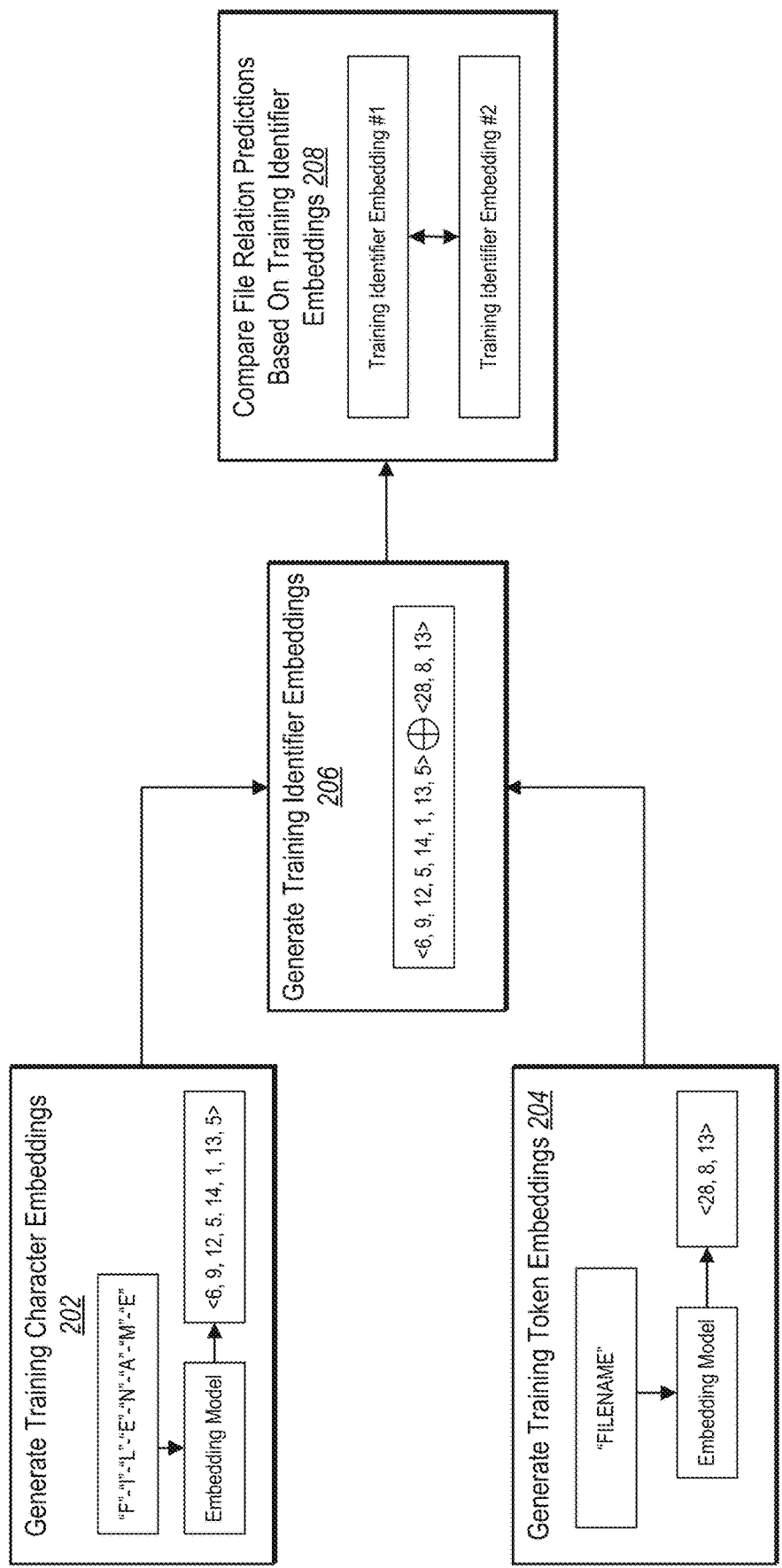
FIGS. 2A-2B illustrate overview diagrams of an identifier embedding system training an embedding machine-learning model and using identifier embeddings in accordance with one or more embodiments.
Figure 2B:
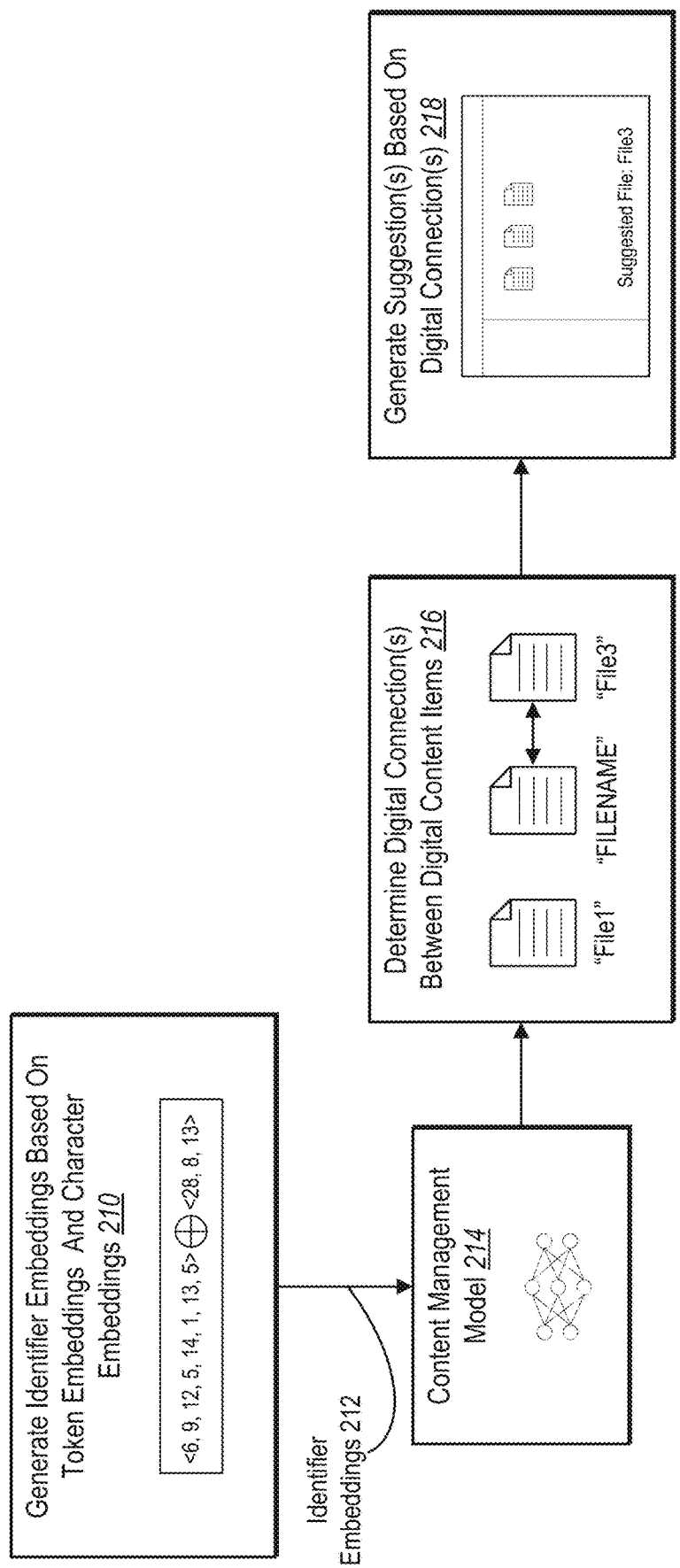

As mentioned above, the identifier embedding system 104 can utilize an embedding machine-learning model to intelligently generate identifier embeddings. Based on the identifier embeddings, a content management model can determine digital connections between digital content items for generating one or more corresponding suggestions. FIGS. 2A-2B illustrate overview diagrams of the identifier embedding system 104 training an embedding machine-learning model and using identifier embeddings in accordance with one or more embodiments. As shown in FIG. 2A at an act 202, the identifier embedding system 104 generates training character embeddings. To generate training character embeddings, the identifier embedding system 104 can use an embedding machine-learning model to process individual characters of respective training identifiers. For example, the embedding machine-learning model may process individual characters of training identifiers (e.g., file names) using a character-level embedding machine-learning model (e.g., as described more below in relation to FIG. 3A and FIG. 5A).

Similarly, at an act 204, the identifier embedding system 104 generates training token embeddings. To generate training token embeddings, the identifier embedding system 104 uses an embedding machine-learning model to process multiple characters included within training identifiers (e.g., words identified within the training identifiers). For example, the embedding machine-learning model may process groups of characters utilizing lexical rules to identify word tokens. Using the identified tokens, the identifier embedding system 104 can generate corresponding training token embeddings for the respective training identifiers using a word-level embedding machine-learning model (e.g., as described more below in relation to FIG. 3B and FIG. 5A).

As shown in FIG. 2A, at an act 206 the identifier embedding system 104 generates training identifier embeddings. To generate each training identifier embedding, the identifier embedding system 104 can combine (e.g., concatenate, average, etc.) training character embeddings and training token embeddings for individual identifiers. By combining training character embeddings and training token embeddings, each training identifier embedding can more effectively represent the informational signals included within a training identifier. Generating identifier embeddings is described more below in relation to FIG. 3C and FIG. 5A.

As illustrated in FIG. 2A, at an act 208 the identifier embedding system 104 compares file relation predictions based on training identifier embeddings. To generate the file relation predictions (or other digital similarity predictions), the identifier embedding system 104 can utilize a trained machine-learning model to process the training identifier embeddings. Additionally, as described more below in relation to FIGS. 5A-5C, the identifier embedding system 104 can compare the file relation predictions with ground truth similarity metrics (e.g., actual file relations). Based on the comparison, the identifier embedding system 104 can determine a loss for updating one or more parameters of the embedding machine-learning model.

As mentioned above, although FIG. 2A illustrates a file relation prediction, in some embodiments the identifier embedding system 104 generates other digital similarity predictions and compares these digital similarity predictions with ground truth similarity metrics. For example, in some embodiments, the identifier embedding system 104 generates digital similarity predictions comprising a predicted similarity percentage for two digital content items. Then, the identifier embedding system 104 can compare the predicted similarity percentages with ground truth similarity metrics comprising user-generated labels indicating how similar the two digital content items actually are.

In other embodiments, the identifier embedding system 104 generates digital similarity metrics comprising a predicted amount of overlap (e.g., an estimated number of common words, a predicted amount of pixel overlap, etc.). In turn, the identifier embedding system 104 can compare the predicted amount of overlap with ground truth similarity metrics comprising ground truth overlap data. Additionally or alternatively, the identifier embedding system 104 may generate a digital similarity metric comprising a likelihood that a user will open a digital content item. The identifier embedding system 104 can compare the likelihood with ground truth similarity metrics indicating whether or not the user opened the digital content item. Similarly, the identifier embedding system 104 may generate a digital similarity metric comprising a likelihood that a user will save a digital content item in one or more file destinations. In this case, the identifier embedding system 104 can compare the likelihood of saving a digital content item in one or more file destinations with a ground truth similarity metric indicating where the user actually saved the digital content item.

Upon training, the identifier embedding system 104 can utilize embedding machine learning models to generate identifier embeddings and determine digital connections.

For example, FIG. 2B illustrates the identifier embedding system 104 generating digital connections and suggestions utilizing an embedding machine learning model. in particular, at an act 210 the identifier embedding system 104 utilizes an embedding machine-learning model (trained in the manner described above in relation to FIG. 2A) to generate identifier embeddings 212. To generate the identifier embeddings 212, the identifier embedding system 104 can combine character embeddings and token embeddings in the manner previously discussed above in relation to act 206 of FIG. 2A.

Further, FIG. 2B shows the identifier embedding system 104 providing the identifier embeddings 212 to a content management model 214. In some embodiments, the content management model 214 is a content suggestion model, a suggested destinations model, a filename recovery model, or other machine-learning model that incorporates contextual features as described below in relation to FIG. 6B.

As shown in FIG. 2B, at an act 216, the identifier embedding system 104 uses the content management model 214 to leverage the identifier embeddings 212 to determine digital connections between digital content items. To illustrate, the identifier embedding system 104 can process the identifier embeddings 212 using the content management model 214 to determine how digital content items may be related. For example, the digital connection between digital content items can include an organizational similarity, a content-based similarity, a correlation based on user activity, or an association based on access privileges (e.g., as described more below in relation to FIG. 6B).

At an act 218, the identifier embedding system 104 uses the digital connections to generate one or more suggestions relating to digital content item(s). For example, the identifier embedding system 104 may generate a suggestion that a user account access a digital content item or share a digital content item with another user account. Moreover, the content management model 214 may surface the one or more suggestions to a user interface of a client device associated with a user account (e.g., as described more below in relation to FIG. 6B and FIGS. 7A-7B).

Although FIGS. 2A-2B illustrate utilizing both a character-level embedding neural network and a word-level embedding neural network, one or more embodiments of the identifier embedding system 104 utilize a different approach. For example, in some embodiments, the identifier embedding system 104 implements the character-level embedding neural network and not the word-level embedding neural network. Similarly, in some embodiments, the identifier embedding system 104 implements a word-level embedding neural network and not the character-level embedding neural network. Still, in other embodiments, the identifier embedding system 104 utilizes additional or alternative models to either or both of the character-level embedding neural network and the word-level embedding neural network.

Additionally or alternatively to the embodiments described above, the identifier embedding system 104 can perform additional training after generating suggestions by applying the character-level embedding neural network and/or the word-level embedding neural network. For example, in some embodiments, the identifier embedding system 104 collects additional training data and performs additional training iterations (e.g., as desired for one or more applications).

Figure 3B:
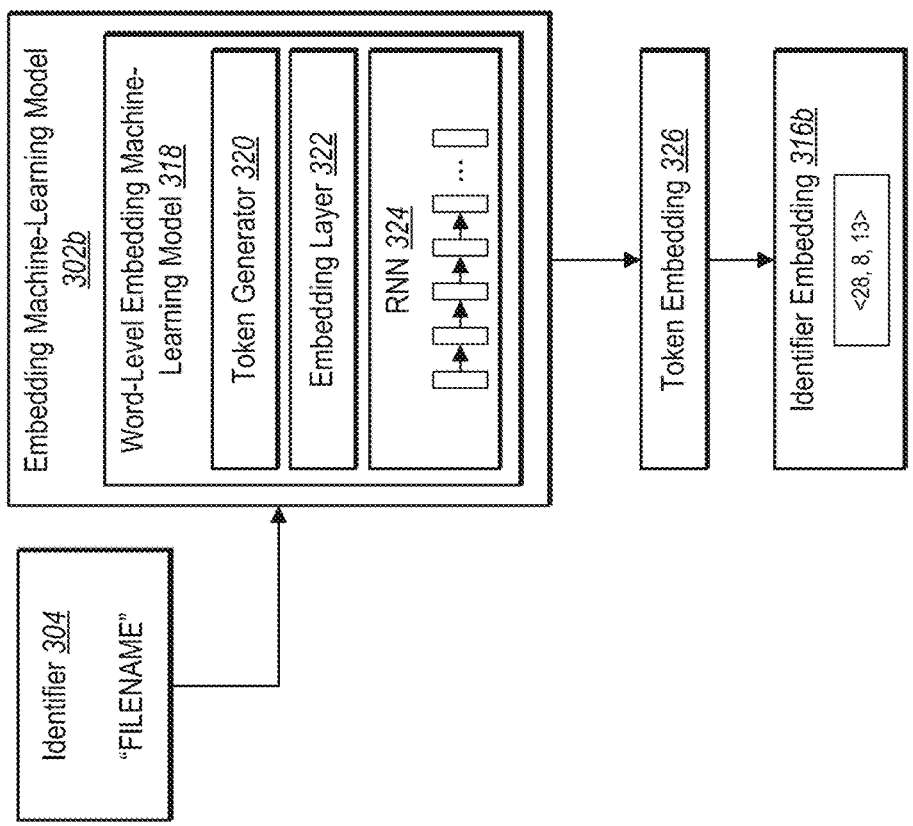
FIGS. 3A-3C illustrate embedding machine-learning models of an identifier embedding system generating identifier embeddings in accordance with one or more embodiments.
Figure 3A:
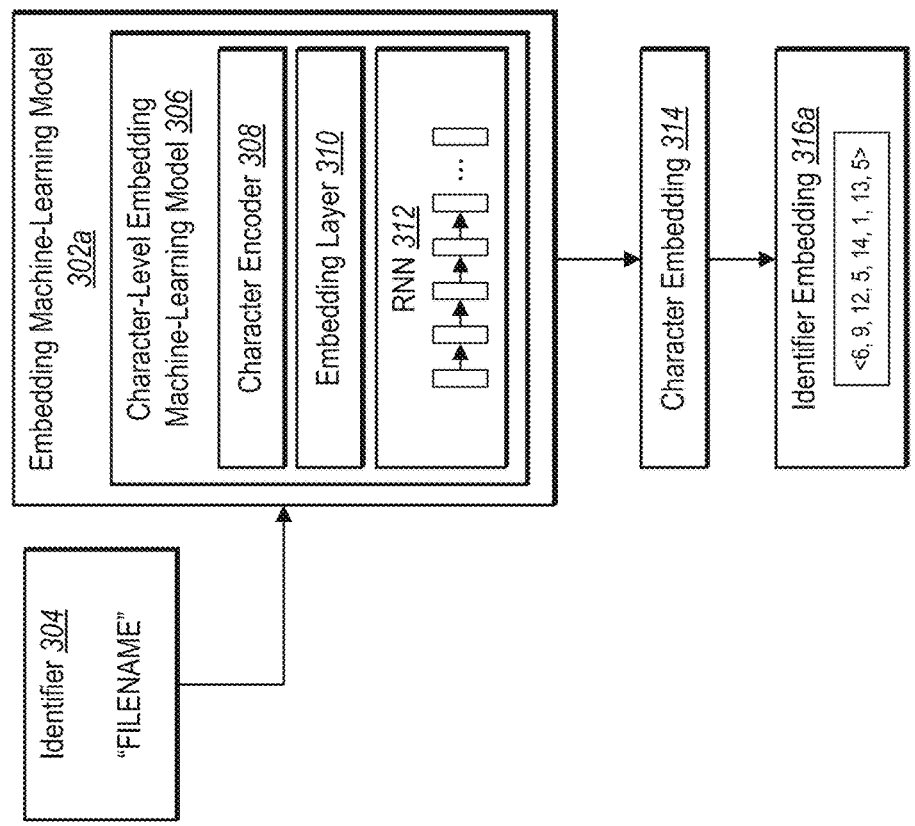
Figure 3C:
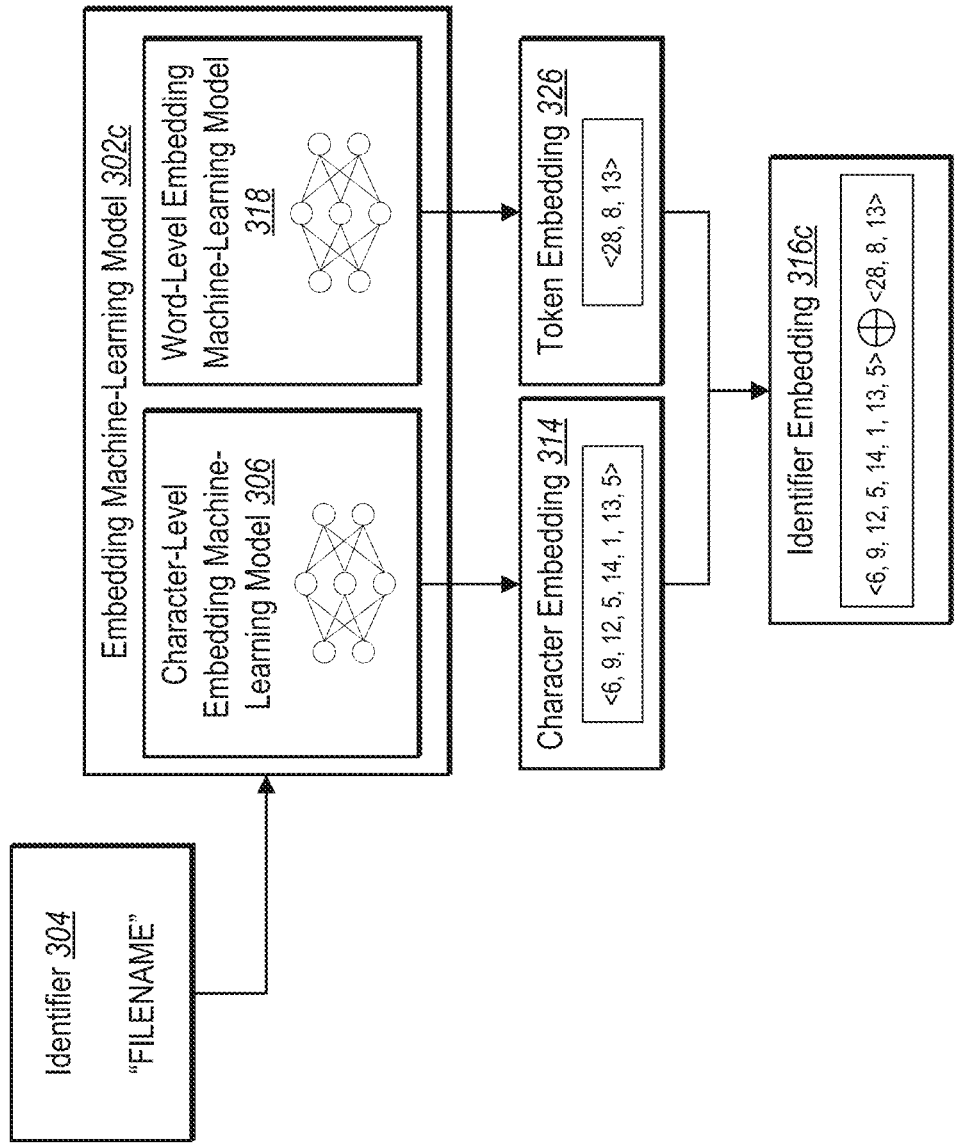

As mentioned above, the identifier embedding system 104 can utilize an embedding machine-learning model. In some embodiments, the embedding machine-learning model can include multiple branches (e.g., a word-level embedding machine-learning model and a character-level embedding machine-learning model). In other embodiments, the embedding machine-learning model does not include multiple branches (e.g., e.g., includes only a word-level embedding machine-learning model or a character-level embedding machine-learning model. FIGS. 3A-3C illustrate these various approaches. In particular, FIGS. 3A-3C illustrate embedding machine-learning models 302a-302c generating identifier embeddings 316a-316c in accordance with one or more embodiments. Specifically, the embedding machine-learning model 302a includes a character-level embedding machine learning model, the embedding machine-learning model 302b includes a word-level embedding machine learning model, while the embedding machine-learning model 302c includes both.

As shown in FIG. 3A, the identifier embedding system 104 processes an identifier 304 via the embedding machine-learning model 302a that comprises a character-level embedding machine-learning model 306. In particular, the character-level embedding machine-learning model 306 processes the identifier 304 via one or more of a character encoder 308, an embedding layer 310, or a recurrent neural network ("RNN") 312.

For example, the character encoder 308 processes the identifier 304 by identifying each individual character of the identifier 304 in preparation for encoding. To identify the individual characters of the identifier 304, the character encoder 308 can parse a character to determine that the character is in-vocabulary (e.g., a printable American Standard Code for Information Interchange "ASCII" character). In addition, the character encoder 308 can parse other characters to determine that a character is out-of-vocabulary ("OOV"). In some embodiments, parsing the individual characters of the identifier 304 may include mapping a character to a character class (e.g., a digit, alphabet character, delimiter, end marker, etc.). For example, in some cases, the character encoder 308 maps characters to a character class by utilizing a character class histogram and/or a character class one-hot tensor.

After identifying the individual characters of the identifier 304, the character encoder 308 can individually encode the respective characters of the identifier 304. For example, the identifier 304 may encode the characters that are in-vocabulary to integer numbers. Additionally, the identifier 304 may encode the characters that are OOV (e.g., to random values, assigned values, or other character representations). In some embodiments, the character encoder 308 encodes characters by applying one or more padding characters (e.g., the zero "0" character). In these or other embodiments, the character encoder 308 may include additional or alternative encoders and/or encoder processes.

In addition, the embedding layer 310 subsequently processes the individually encoded characters of the identifier 304. To illustrate, the embedding layer 310 converts a list of encoded characters (e.g., represented as integer indices) into vector format. For example, the embedding layer 310 may convert the list of encoded characters into a series of n-dimensional encoded character vectors of fixed or variable length. That is, the embedding layer 310 can generate, for each encoded character, an encoded character vector. For example, the encoded character vector may represent a specific encoded character in one or more of the following ways:

[n_digit, n_alpha, n_else]/length(filename),
[n_digit, n_alpha, n_delimiter, n_else]/length(filename),
[n_else, n_digit, n_alpha, n_dot, n_delimiter]/length(filename), where the term "n_digit" represents a vector value if the specific encoded character is a number, the term "n_alpha" represents a vector value if the specific encoded character is an alphabetic letter, the term "n_else" represents a vector value if the specific encoded character is OOV, the term "n_delimiter" represents a vector value if the specific encoded character is a delimiter, the term "n_dot" represents a vector value if the specific encoded character is a dot or period, and the term "length(filename)" represents a vector value for a length or dimension of a sequence of token vectors for the identifier 304.

Although the foregoing provides a specific example of encoding characters in an identifier, the identifier embedding system 104 can use a variety of encoding approaches. For example, the identifier embedding system 104 can map each available character to a corresponding value (e.g., according to an index).

Further shown in FIG. 3A, the RNN 312 processes the sequence of encoded character vectors from the embedding layer 310. The RNN 312 can analyze input data sequentially utilizing a plurality of cells or layers. For example, the RNN 312 can process individual characters, tokens, etc. in a sequence utilizing individual layers. To illustrate, the RNN 312 can pass information from a first analysis at a first cell or first layer to subsequent cells or layers within the RNN 312. The RNN 312 then repeats this approach through the sequence of cells or layers. Accordingly, the subsequent cells or layers in the RNN 312 can learn from previous analyses of prior cells or layers in the sequence such that the RNN 312 ultimately generates a character embedding 314. As illustrated, the embedding machine-learning model 302a utilizes the character embedding 314 as the identifier embedding 316a.

With respect to FIG. 3B, the embedding machine-learning model 302b processes the identifier 304 via the embedding machine-learning model 302b that comprises a word-level embedding machine-learning model 318. In particular, the word-level embedding machine-learning model 318 processes the identifier 304 via one or more of a token generator 320, an embedding layer 322, or an RNN 324. For example, the token generator 320 processes the identifier 304 by generating one or more tokens that each include multiple characters of the identifier 304. As will be described more below in relation to FIG. 4, the token generator 320 can utilize lexical rules to separate and group together combinations of characters of the identifier 304 into tokens (e.g., words).

In some embodiments, the token generator 320 can generate tokens by creating candidate groups of characters. In turn, the token generator 320 can analyze the candidate groups of characters to determine whether the resulting tokens are accurate. For example, the token generator 320 may compare the resulting tokens to actual words that correspond to a dictionary of accepted tokens (e.g., that are in-vocabulary). Based on the comparison, the token generator 320 may iterate or accept the generated token.

In some cases, the token generator 320 can generate tokens that correspond to certain token categories (e.g., time, date, camera name, image location, etc.). In these or other embodiments, generating tokens based on token categories may be advantageous in implementations where the identifier 304 is autogenerated (e.g., by a computing device, such as a camera or mobile phone). In this manner, the token generator 320 can generate tokens with broader or more generalized application. For example, the identifier embedding system 104 may generate tokens that include dates, location identification, organization identification, or other character groupings.

Using the tokens from the token generator 320, the embedding layer 322 can generate respective token vectors (e.g., a series or sequence of respective token vectors). For example, the embedding layer 322 may generate token vectors in a same or similar manner described above for the embedding layer 310 of FIG. 3A. To illustrate, the embedding layer 322 may convert a token that is in-vocabulary with a corresponding integer value (e.g., based on the spaCy pre-trained English model). For tokens that are OOV (e.g., unknown with respect to a pretrained dictionary), the embedding layer 322 may generate an assigned value (e.g., all zeros), a random value, etc. In particular embodiments, the embedding layer 322 generates the respective token vectors as 300-dimensional. In some embodiments, the embedding layer 322 truncates and/or pads a sequence of token vectors (e.g., to a maximum length of 16). Additionally or alternatively, in some embodiments the embedding layer 322 may include or append an average of at least a portion of the sequence of token vectors (e.g., to capture a long tail of longer filenames).

In these or embodiments, the embedding layer 322 may include one or more machine-learning models for generating a token vector in a manner that embeds context data into the token vector based on other tokens or token vectors. Examples of such machine-learning models for the embedding layer 322 can include word2vec (as described in Tomas Mikolov, Ilya Sutskever, Kai Chen, Greg Corrado, and Jeffrey Dean, *Distributed representations of words and phrases and their compositionality*, In Proceedings of the 26th International Conference on Neural Information Processing Systems—Volume 2, NIPS'13, 2013, pages 3111-3119, USA. Curran Associates Inc., hereby incorporated by reference in its entirety) or GloVe (as described in Jeffrey Pennington, Richard Socher, and Christopher, D. Manning, *Glove: Global vectors for word representation*, In EMNLP, 2014, hereby incorporated by reference in its entirety).

As similarly described above for FIG. 3A, the RNN 324 can process a sequence of token vectors from the embedding layer 322. For example, in a same or similar manner as described above for the RNN 312, the RNN 324 can process individual characters, tokens, etc. in a sequence utilizing individual layers. Based on the processing at a first cell of the RNN 324, subsequent cells of the RNN 324 can use information (e.g., a latent feature vector) passed from the first cell as context. After processing through each of the cells in the RNN 324, the RNN 324 can generate a token embedding 326. In addition, the embedding machine-learning model 302b utilizes the token embedding 326 as the identifier embedding 316b.

Additionally or alternatively, the RNN 324 and/or the RNN 312 may include other sequence analysis models (e.g., seq2seq models such as a long short-term memory neural network, a gated recurrent unit, etc.) Further, in some embodiments, the RNN 324 and/or the RNN 312 may include one or more optimization layers, such as neural attention mechanisms or transformers (e.g., a BERT model as described in Jacob Devlin, Ming-Wei Chang, Kenton Lee, and Kristina Toutanova, Bert: *Pre-training of deep bidirectional transformers for language understanding*, CoRR, abs/1810.04805, 2018, the entire contents of which are expressly incorporated herein by reference).

As mentioned above, in some embodiments the identifier embedding system 104 can utilize both character-level and word-level embedding machine-learning models. Indeed, as shown in FIG. 3C, the embedding machine-learning model 302c comprises both the character-level embedding machine-learning model 306 and the word-level embedding machine-learning model 318 as separate, independent model branches. In particular, the character-level embedding machine-learning model 306 and the word-level embedding machine-learning model 318 of the embedding machine-learning model 302c each process the identifier 304 in a separate, independent fashion. In this manner, the character-level embedding machine-learning model 306 generates the character embedding 314, and the word-level embedding machine-learning model 318 generates the token embedding 326, as respectively described above in relation to FIGS. 3A-3B.

As shown in FIG. 3C, the embedding machine-learning model 302c generates the identifier embedding 316c by combining the character embedding 314 and the token embedding 326. In some embodiments, combining the character embedding 314 and the token embedding 326 comprises concatenating, averaging, weighting, blending, performing a difference operation, performing a dot product operation. In these or other embodiments, the identifier embedding 316c is a combination of the character embedding 314 and the token embedding 326 and thus provides a more exhaustive, effective representation of the identifier 304.

Figure 4:
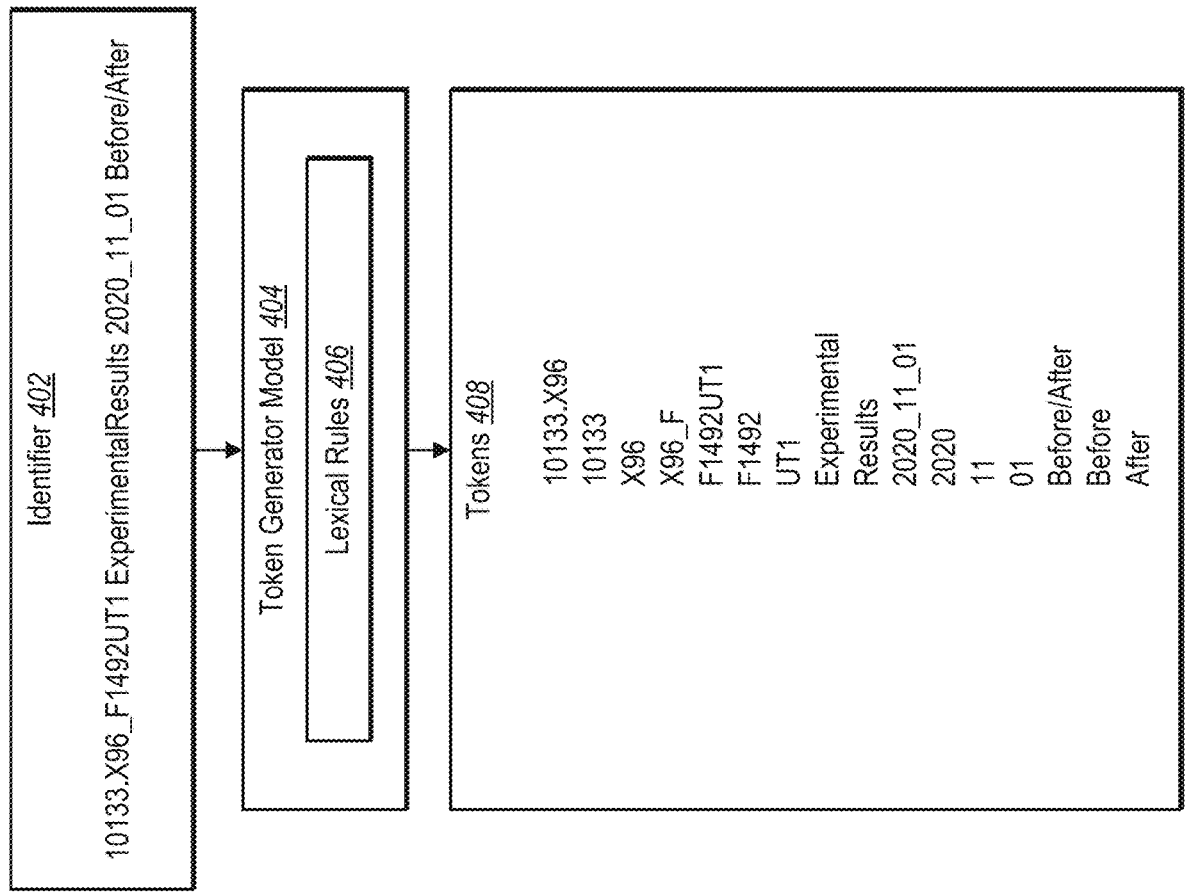
FIG. 4 illustrates an identifier embedding system utilizing a token generator model with lexical rules to generate tokens for an identifier in accordance with one or more embodiments.

As mentioned above, the identifier embedding system 104 can utilize a word-level embedding machine-learning model that separates and groups characters into tokens for generating token embeddings. In one or more embodiments, the identifier embedding system 104 utilizes lexical rules to do so. FIG. 4 illustrates the identifier embedding system 104 utilizing a token generator model 404 with lexical rules 406 to generate tokens 408 for an identifier 402 in accordance with one or more embodiments. In these or other embodiments, the token generator model 404 is the same as or similar to the token generator 320 of FIG. 3B.

As used herein, the term "lexical rules" refers to one or more heuristics for generating tokens. In particular, lexical rules can include one or more heuristics relating to character casing (e.g., capitalization, non-capitalization) and delimiters (e.g., a sequence of one or more characters for specifying a boundary between portions of an identifier). An example of utilizing lexical rules is provided below in relation to FIG. 4.

As shown in FIG. 4, the identifier 402 comprises an example filename of "10133.X96 F1492UT1 Experimental-Results 2020 11 01 Before/After." Additionally shown, the identifier 402 comprises multiple delimiters: a period between "3" and "X," an underscore between "6" and "F," a space between "1" and "E," a space between "s" and "2," an underscore between "0" and "1," another underscore between "1" and "0," a space between "1" and "B," and a slash between "e" and "A."

Based on the lexical rules 406, the token generator model 404 can use delimiters of the identifier 402 to generate the tokens 408. For example, one of the lexical rules 406 may include grouping characters of the identifier 402 that are positioned between two sequential delimiters (e.g., "X96," or "F1492UT1" fall between delimeters of "." "_" and a space). As another example, one of the lexical rules 406 may include grouping characters of the identifier 402 that are positioned between a first character of the identifier 402 and an immediately succeeding delimiter (e.g., "10133"). Similarly, one of the lexical rules 406 may include grouping characters of the identifier 402 that are positioned between a last character of the identifier 402 and an immediately preceding delimiter (e.g., "After").

Additionally or alternatively, the token generator model 404 may utilize character casing of the identifier 402 to generate the tokens 408. For example, one of the lexical rules 406 may include grouping characters of the identifier 402 starting with a capital letter and inclusively selecting characters in a left-to-right manner until a next capital letter or delimiter (e.g., "Experimental," "Results," "Before"). As another example, one of the lexical rules 406 may include grouping characters of the identifier 402 that are both sequential and share a same character casing (e.g., "Before," "After").

Further, in some embodiments, the token generator model 404 may utilize a combination of elements to generate the tokens 408. For example, one of the lexical rules 406 may include grouping like characters of the identifier 402 together that are separated by a delimiter (e.g., "2020_11_01"). As another example, one of the lexical rules 406 may include grouping characters of the identifier 402 that include characters following a prefix and/or preceding a suffix (e.g., "F1492UT1" where "F" is a prefix and "UT1" is a suffix).

Additionally or alternatively, the token generator model 404 may include a machine-learning model. For example, the token generator model 404 may include a machine-learning model trained to generate predicted tokens based on candidate cuts or separations for grouping characters in the identifier 402. In this example, the machine-learning model may generate a plurality of candidate tokens comprising characters of the 402 based on character boundaries. The character boundaries may be randomly generated or heuristically generated as described above.

Based on the plurality of candidate tokens, the machine-learning model can generate corresponding token scores or token probabilities for each of the candidate tokens. In some embodiments, the token scores or token probabilities represent a likelihood (e.g., a confidence score) that a given candidate token is an actual token correctly identified by the machine-learning model. Accordingly, the machine-learning model may identify a subset of candidate tokens that correspond to a token score or token probability that satisfies a token score threshold or a token probability threshold. In response, the machine-learning model may output the subset of candidate tokens as identified tokens for generating a token embedding as described above.

To train the token generator model 404 as a machine-learning model just described, the identifier embedding system 104 can compare predicted tokens with ground truth data (e.g., a predetermined vocabulary of tokens, such as a dictionary or pre-labeled filenames) to determine a loss using a loss function. Based on this determined loss, the identifier embedding system 104 can adjust various parameters/hyperparameters to improve the quality/accuracy of a predicted token in subsequent training iterations.

Figure 5A:
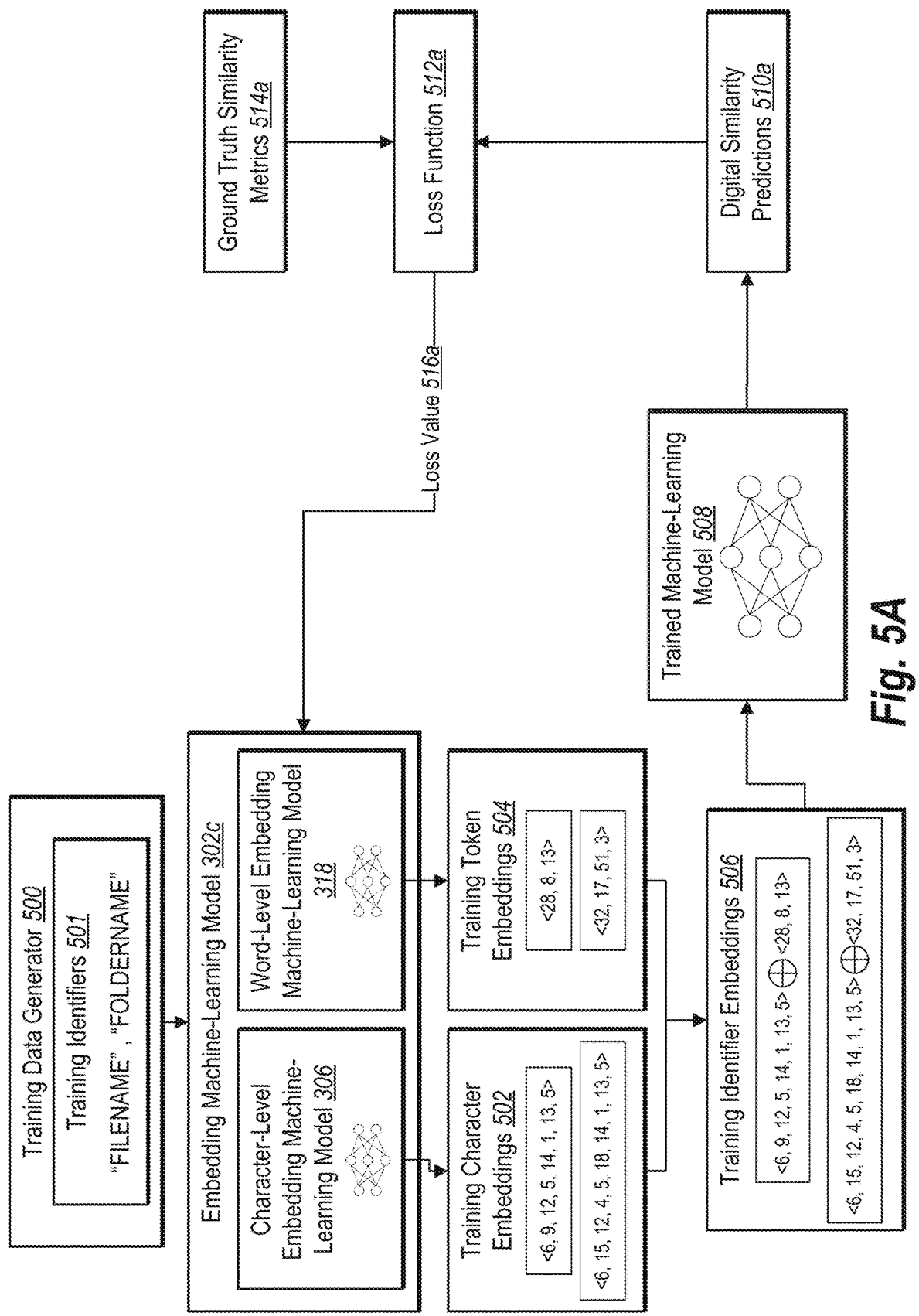
FIGS. 5A-5C illustrate an identifier embedding system training an embedding machine-learning model in accordance with one or more embodiments.
Figure 5B:
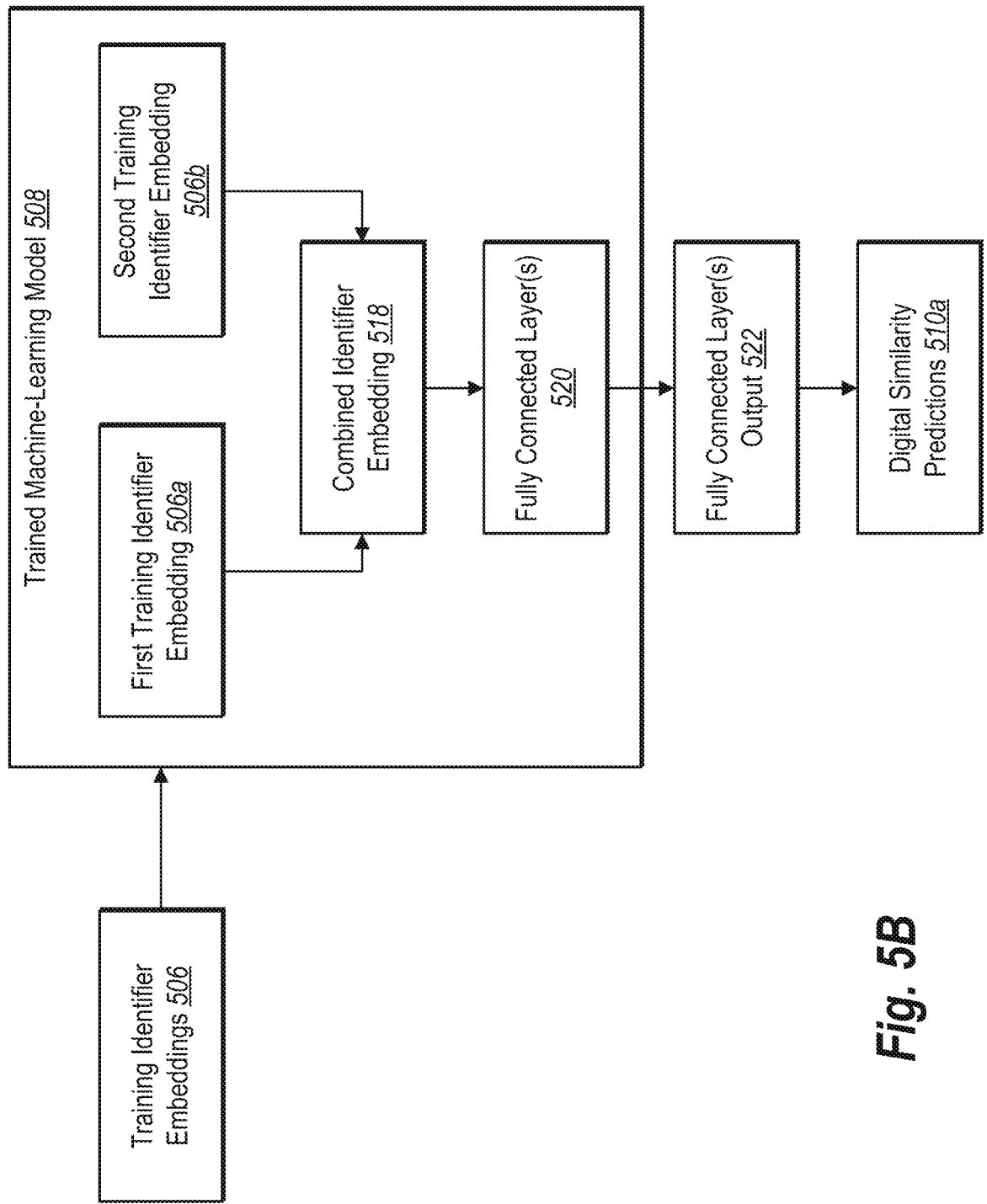
Figure 5C:
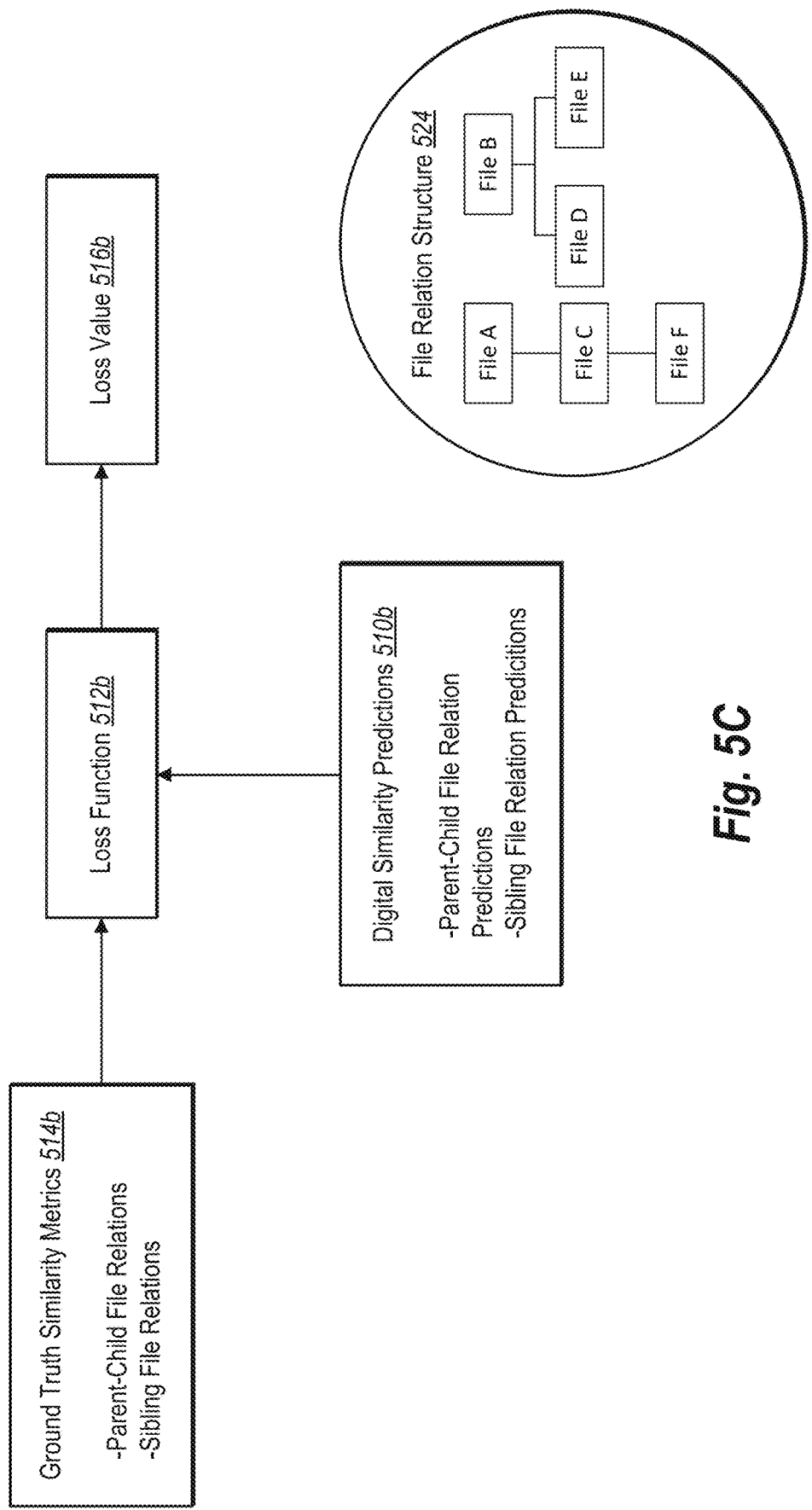

As mentioned above, the identifier embedding system 104 utilizes a trained embedding machine-learning model to generate identifier embeddings. As discussed above, the identifier embedding system 104 can utilize a training approach that leverages known or observed data from the content management system 103. For example, FIGS. 5A-5C illustrate the identifier embedding system 104 training an embedding machine-learning model in accordance with one or more embodiments. In particular, FIG. 5A illustrates the identifier embedding system 104 utilizing a trained machine-learning model 508 to train the embedding machine-learning model 302c.

As used herein, the term "train" refers to utilizing information to tune or teach a machine-learning model. The term "training" (used as an adjective or descriptor, such as "training identifier embedding," "training character embedding," or "training token embedding") refers to information or data utilized to tune or teach a machine-learning model, such as an embedding machine-learning model. Based on digital similarity predictions generated from such training data, the identifier embedding system can compare the digital similarity predictions to ground truth similarity metrics (e.g., ground truth data) for generating a loss. An example of a ground truth similarity metric includes actual file relations (e.g., structural associations indicating organization or storage within a content management system relative to other digital content items).

Specifically, as shown in FIG. 5A, the identifier embedding system 104 utilizes a training data generator 500 to generate training identifiers 501 that correspond to a plurality of training digital content items. In some embodiments, the training data generator 500 generates the training identifiers 501 by sampling identifiers associated with digital content items of specific user accounts (e.g., non-team user accounts, English user accounts, etc.). In some embodiments, the training data generator 500 samples file object ID numbers from a repository of digital content items. The training data generator 500 can extract ground truth similarity metrics (e.g., file relations or other similarity measures) from a knowledge graph corresponding to the repository of digital content items and utilize the file object ID numbers to identify training filenames.

Based on the sampled identifiers, the identifier embedding system 104 generates the training identifiers 501 by performing one or more preprocessing operations. For example, in some embodiments, the training data generator 500 verifies if file relations between digital content items are accurate post-sampling. To illustrate, a folder structure (e.g., the file relation structure 524 described below in relation to FIG. 5C) or the sampled identifier itself may have changed post-sampling. Based on detected changes, the training data generator 500 may modify and/or update training data (including sampled identifiers).

As additional example preprocessing operations, the training data generator 500 may replace non-ASCII characters in a sampled identifier with a value designated for 00V characters. Further, in some embodiments, the training data generator 500 balances a number of examples for each positive class. For example, the training data generator 500 may balance a number of identifiers for digital content items that positively correspond to the classes of no file relation, a parent-child file relation, or a sibling file relation. Additionally or alternatively, the training data generator 500 generates negative samples based on a negative ratio. For example, the training data generator 500 may generate identifiers to affirmatively not correspond to the classes of no file relation, a parent-child file relation, or a sibling file relation.

As shown in FIG. 5A, the embedding machine-learning model 302c generates training character embeddings 502 and training token embeddings 504 based on the training identifiers 501 (e.g., in a same or similar manner as described above in relation to FIGS. 3A-3C). In addition, the embedding machine-learning model 302c generates training identifier embeddings 506 by combining the training character embeddings 502 and the training token embeddings 504 as also described above in relation to FIGS. 3A-3C.

Using the training identifier embeddings 506, the trained machine-learning model 508 can generate digital similarity predictions 510a. The trained machine-learning model 508 applies one or more learned parameters in analyzing the training identifier embeddings 506 to generate the digital similarity predictions 510a. For example, the trained machine-learning model 508 can generate the digital similarity predictions 510a that comprise predicted relationships between the training identifier embeddings 506 (e.g., file relation predictions as will be described below in relation to FIG. 5C).

As another example, the trained machine-learning model 508 may generate the digital similarity predictions 510a as comprising workflow predictions. In this example, the trained machine-learning model 508 may be trained to recognize patterns of the training identifier embeddings 506 reflecting an order of access. To illustrate, the trained machine-learning model 508 may predict which of the training identifier embeddings 506 correspond to a particular sequence or combination of identifiers of digital content items that a user may access in performing some user activity or operation. Thus, in some embodiments, the digital similarity predictions 510a may reflect a first digital content item that, when accessed, a user account also accesses one or more additional digital content items.

In yet another example, the trained machine-learning model 508 may generate the digital similarity predictions 510a as comprising file sharing predictions. In this example, the trained machine-learning model 508 may be trained to recognize sharing patterns with respect to the training identifier embeddings 506. To illustrate, the trained machine-learning model 508 may predict which of the training identifier embeddings 506 correspond to identifiers of digital content items that a user may typically share in performing some user activity or operation. Thus, in some embodiments, the digital similarity predictions 510a may reflect a likelihood that a digital content item will be shared with one or more other user accounts.

In other embodiments, the digital similarity predictions 510a may include myriad other types of predictions. Indeed, depending on the task that the trained machine-learning model 508 may be trained to perform, the digital similarity predictions 510a may include a variety of predictions that can inform the embedding machine-learning model 302c.

As shown in FIG. 5A, using a loss function 512a, the identifier embedding system 104 can compare the digital similarity predictions 510a and ground truth similarity metrics 514a to determine a loss value 516a. With respect to the ground truth similarity metrics 514a, the ground truth similarity metrics 514a can include a variety of types of ground truth data (e.g., actual file relations as described more below in relation to FIG. 5C). For example, if the trained machine-learning model 508 generates the digital similarity predictions 510a as comprising workflow predictions, then the ground truth similarity metrics 514a may include observed workflow data. Similarly, if the trained machine-learning model 508 generates the digital similarity predictions 510a as comprising file sharing predictions, then the ground truth similarity metrics 514a may include observed sharing data. Moreover, the trained machine-learning model 508 can include one or more of the machine-learning models discussed above in relation to FIG. 2A.

In these or other embodiments, the loss function 512a can include a regression loss function (e.g., a mean square error function, a quadratic loss function, an L2 loss function, a mean absolute error/L1 loss function, mean bias error, etc.). Additionally or alternatively, the loss function 512a can include a classification loss function (e.g., a hinge loss/multi-class SVM loss function, cross entropy loss/negative log likelihood function, etc.).

Further, the loss function 512a (e.g., as part of a backpropagation process) can return quantifiable data regarding the difference between the digital similarity predictions 510a and the ground truth similarity metrics 514a. In particular, the identifier embedding system 104 can return the loss value 516a from the loss function 512a such that the embedding machine-learning model 302c can adjust parameters to improve the quality and accuracy of identifier embeddings by narrowing the difference between the digital similarity predictions 510a and the ground truth similarity metrics 514a. Additionally, as mentioned below, the identifier embedding system can jointly train the trained machine-learning model 508 and the embedding machine-learning model 302c. Moreover, the training/learning shown in FIG. 5A can be an iterative process such that the identifier embedding system 104 can continually adjust parameters of the embedding machine-learning model 302c and/or the trained machine-learning model 508 over learning cycles.

Although not illustrated in FIG. 5A, one or more embodiments of the identifier embedding system 104 train the trained machine-learning model 508 as a similarity prediction machine-learning model that generates digital similarity predictions between two digital content items. To train the similarity prediction machine-learning model, the identifier embedding system 104 can sample training digital content items and corresponding ground truth data (e.g., actual or observed similarities between training digital content items). In turn, the similarity prediction machine-learning model can process the training digital content items utilizing the similarity prediction machine-learning model to generate digital similarity predictions. The identifier embedding system 104 can then generate loss data utilizing a loss function based on a comparison between the digital similarity predictions and the ground truth data. With the loss data, the identifier embedding system 104 can update one or more parameters of the similarity prediction machine-learning model.

In some embodiments (albeit not illustrated in FIG. 5A), the identifier embedding system 104 jointly trains the with the embedding machine-learning model 302c and the similarity prediction machine-learning model. In this example, the identifier embedding system 104 can backpropagate loss data from the loss function. Using the loss data, the identifier embedding system 104 can then modify both the parameters of the embedding machine-learning model 302c and the parameters of the similarity prediction machine-learning model.

FIG. 5B illustrates a schematic diagram of the trained machine-learning model 508 used in training the embedding machine-learning model 302c in accordance with one or more embodiments. As shown, the trained machine-learning model 508 processes the training identifier embeddings 506 (e.g., two at a time in pair-wise fashion). In particular, the trained machine-learning model 508 processes a first training identifier embedding 506a and a second training identifier embedding 506b. In some cases, the first training identifier embedding 506a corresponds to a training identifier for a contextual digital content item (e.g., a digital content item associated with user activity). Additionally, the second training identifier embedding 506b can correspond to a training identifier for a target digital content item (e.g., a digital content item under question for determining its relationship to the contextual digital content item).

In addition, the trained machine-learning model 508 generates a combined identifier embedding 518 by combining the first training identifier embedding 506a and the second training identifier embedding 506b. In these or other embodiments, generating the combined identifier embedding 518 comprises performing one or more of concatenating, averaging, weighting, blending, performing a difference operation, performing a dot product operation, etc.

Subsequently, the trained machine-learning model 508 processes the combined identifier embedding 518 using one or more fully connected layers 520. In particular, in one or more embodiments, the trained machine-learning model 508 comprises a neural network (e.g., a convolutional neural network) with one or more neural network layers. For example, in processing the combined identifier embedding 518, a first layer generates an output feature vector based on the combined identifier embedding 518. This feature vector then feeds into a second layer. In particular embodiments, the fully connected layers 520 comprises a predicting head with two dense fully connected layers (e.g., with dropout to prevent overfitting).

Moreover, based on the combined identifier embedding 518, the fully connected layers 520 generates a fully connected layers output 522. In some embodiments, the fully connected layers output 522 comprises one or more prediction scores or prediction probabilities that indicate a likelihood or confidence level (e.g., 70%, 80%, 95%, etc.) associated with each digital similarity prediction. For example, the fully connected layers output 522 can include a first file relation score for a parent-child file relation and a second file relation score for a sibling file relation. To illustrate, the fully connected layers output 522 may include respective scores or labels associated with certain prediction categories (e.g., a no-relation prediction, a parent prediction, a child prediction, or a sibling prediction). For instance, the fully connected layers output 522 may include a label of "0" if the digital similarity prediction corresponds to a no-relation prediction, and a label of "1" if the digital similarity prediction corresponds to a parent prediction. Further, the fully connected layers output 522 may include a label of "2" if the digital similarity prediction corresponds to a child prediction, and a label of "3" if the digital similarity prediction corresponds to a sibling prediction.

Based on the fully connected layers output 522, the trained machine-learning model 508 generates the digital similarity predictions 510a. For example, the trained machine-learning model 508 may compare the prediction scores to determine a highest prediction score that satisfies (e.g., meets or exceeds) a prediction score threshold. Additionally or alternatively, the trained machine-learning model 508 may compare the prediction scores to determine a set of prediction scores that satisfy the prediction score threshold. Based on one or more of the prediction scores satisfying the prediction score threshold and/or outscoring other prediction scores, the trained machine-learning model 508 can generate the digital similarity predictions 510a.

In other embodiments not illustrated in FIG. 5B, the trained machine-learning model 508 may include additional or alternative components for modifying the training process. For example, in some embodiments, the trained machine-learning model 508 includes multiple branches for receiving the training character embeddings 502 and the training token embeddings 504 as separate inputs (as opposed to the training identifier embeddings 506). In this example, the trained machine-learning model 508 may process the training character embeddings 502 and the training token embeddings 504 separately. For instance, in one branch of the trained machine-learning model 508, the trained machine-learning model 508 may generate a combined character embedding by combining a first training character embedding and a second training character embedding. Similarly, in a second branch of the trained machine-learning model 508, the trained machine-learning model 508 may generate a combined token embedding by combining a first training token embedding and a second training token embedding. In turn, the trained machine-learning model 508 may process the combined character embedding and the combined token embedding at separate fully connected layers or at the same fully connected layers (e.g., the fully connected layers 520).

FIG. 5C illustrates the identifier embedding system 104 utilizing digital similarity predictions 510b from the trained machine-learning model 508 to train the embedding machine-learning model 302c in accordance with one or more embodiments. As shown, the digital similarity predictions 510b comprises parent-child file relation predictions and sibling file relation predictions. In some embodiments, the digital similarity predictions 510b also comprise other file relation predictions (e.g., no direct file relation predictions).

As further shown, a file relation structure 524 comprises digital content items (e.g., File A-File F) associated with certain file relations. Based on the file architecture or hierarchy of the file relation structure 524, File A is a parent file. Parent files have child files. That is, a parent file includes or stores a child file. Thus, according to the file relation structure 524, File A is a parent file to both File C and File F. Similarly, File C is parent file to File F. Likewise, File B is a parent file to File D and File E.

Furthermore, some files in the file relation structure 524 form sibling file relations. Sibling file relations exist between two or more digital content items that are hierarchically equivalent (e.g., by being stored in a same folder or workspace as each other). Accordingly, File D and File E are sibling files in the file relation structure 524.

Other files in the file relation structure 524 may form no direct file relation. Files without direct file relations to other files include files that are neither parent-child files nor sibling files. Accordingly, File A, File C and File F each have no direct file relations to any of File B, File D, or File E (and vice-versa).

In these or other embodiments, the file relation predictions of the digital similarity predictions 510b predict how the training identifier embeddings 506 correlate to digital content items (e.g., File A-File F) in the file relation structure 524. For example, the trained machine-learning model 508 may generate the digital similarity predictions 510b as comprising a parent-child file relation prediction if the first training identifier embedding 506a and the second training identifier embedding 506b are respective identifiers for the digital content items File A and File C. Similarly, the trained machine-learning model 508 may generate the digital similarity predictions 510b as comprising a sibling file relation prediction if the first training identifier embedding 506a and the second training identifier embedding 506b are respective identifiers for the digital content items File D and File E. Further, the trained machine-learning model 508 may generate the digital similarity predictions 510b as comprising a no-direct file relation prediction if the first training identifier embedding 506a and the second training identifier embedding 506b are respective identifiers for the digital content items File A and File E.

As shown in FIG. 5C, the identifier embedding system 104 can compare the digital similarity predictions 510b and ground truth similarity metrics 514b utilizing a loss function 512b (e.g., as similarly described above in relation to FIG. 5B). Specific to FIG. 5C, however, the ground truth similarity metrics 514b includes ground truth data in the form of actual parent-child file relations and sibling file relations. For example, the ground truth similarity metrics 514b may include a digitally accessible table, tree structure, or other searchable data structure that represents a file relation structure and actual file relations between digital content items. In another example, the ground truth similarity metrics 514b comprises pairs of digital content items, an actual file relation between each pair of digital content items, and their corresponding training identifiers and training identifier embeddings. Accordingly, in some embodiments, the identifier embedding system 104 compares the digital similarity predictions 510b and the ground truth similarity metrics 514b by querying or searching the ground truth similarity metrics 514b.

In turn, the identifier embedding system 104 can generate a loss value 516b based on the loss function 512b to reflect the comparison between the digital similarity predictions 510b and the ground truth similarity metrics 514b. From the loss value 516b, the identifier embedding system 104 can update one or more parameters of the embedding machine-learning model 302c as part of a training cycle as described above. In particular, the identifier embedding system 104 can perform a back-propagation operation to modify internal parameters of the embedding machine-learning model 302c. Moreover, by training on file relations as discussed for this embodiment, the identifier embedding system 104 can update one or more parameters of the embedding machine-learning model 302c so as to learn how to generate identifier embeddings in a more representative manner.

In other embodiments, the identifier embedding system 104 generates the loss value 516b based on other digital similarity predictions. For example, as discussed above in relation to FIG. 2A, the identifier embedding system 104 can utilize digital similarity metrics that include or are based on predicted similarity percentages. In other embodiments, the digital similarity metrics may include predicted amounts of overlap, estimated likelihoods of opening a digital content item, predicted likelihoods of saving a file at one or more destinations, etc.

Figure 6A:
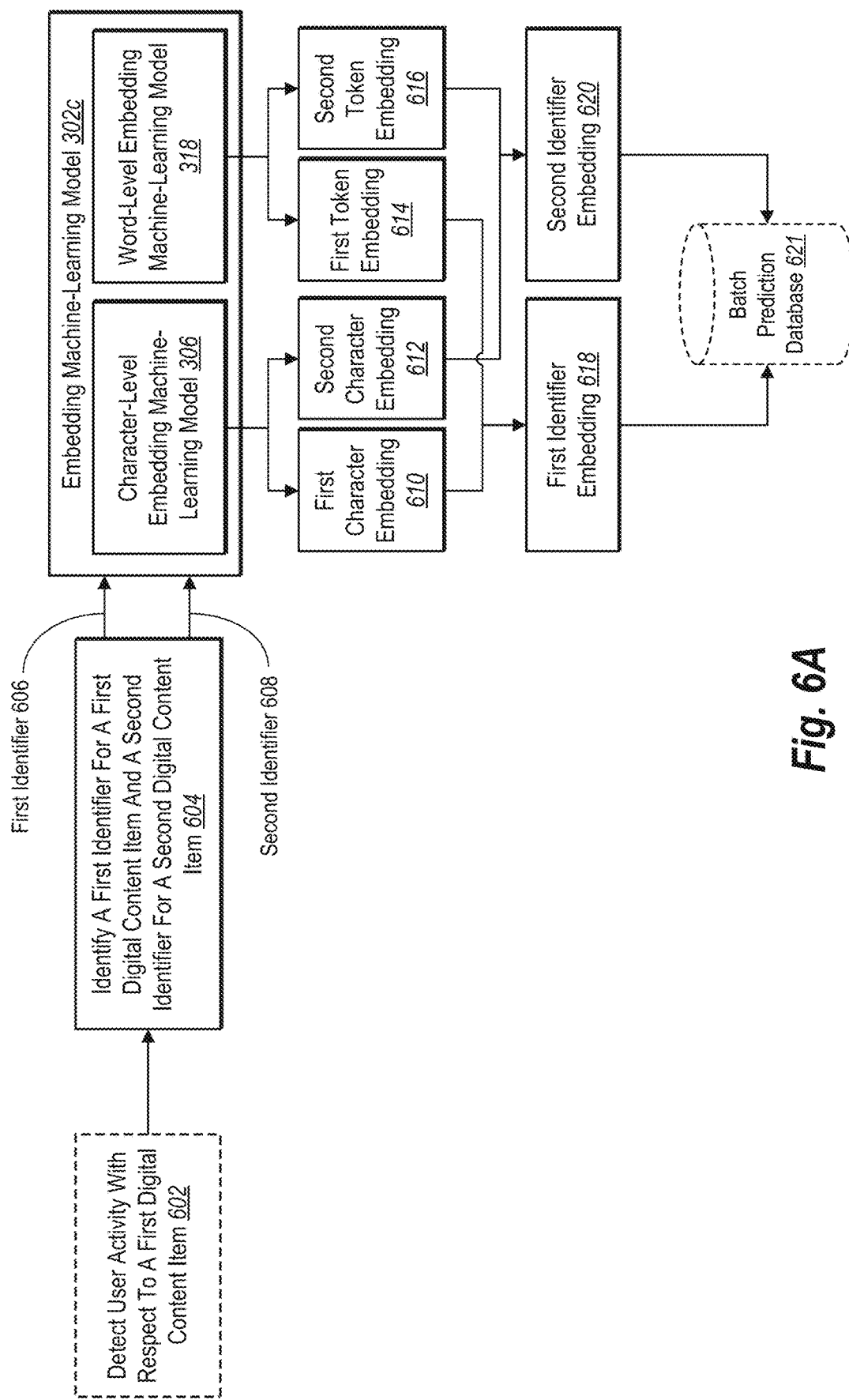
FIGS. 6A-6B illustrate an identifier embedding system generating and processing identifier embeddings to determine digital connections between digital content items and generate corresponding suggestions in accordance with one or more embodiments.
Figure 6B:
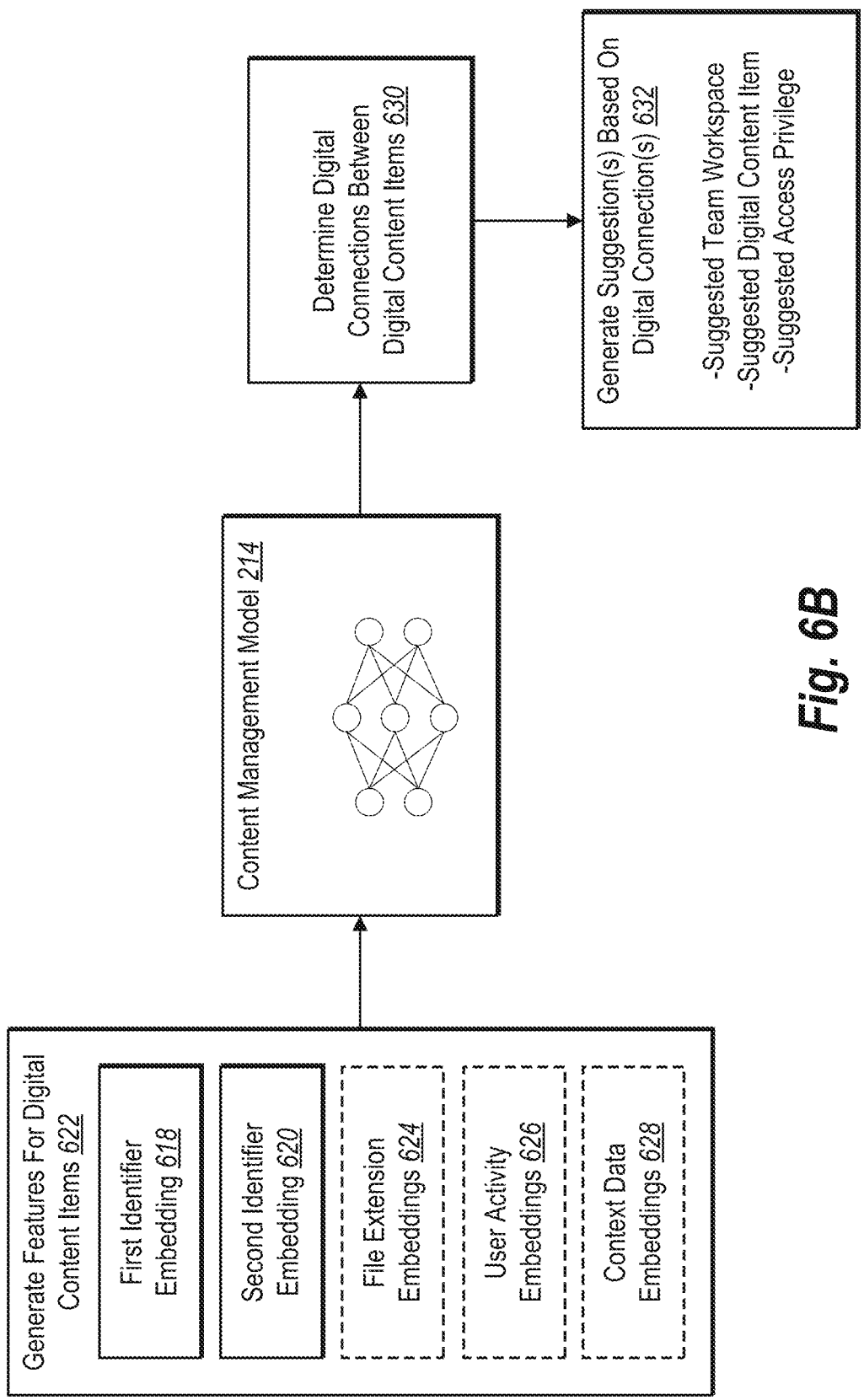

As mentioned above, the identifier embedding system 104 can utilize a trained embedding machine-learning model to intelligently generate identifier embeddings as feature inputs for a content management model. FIGS. 6A-6B respectively illustrate the identifier embedding system 104 generating and processing identifier embeddings to determine digital connections between digital content items and generate corresponding suggestions in accordance with one or more embodiments.

As shown in FIG. 6A, the identifier embedding system 104 detects user activity with respect to a first digital content item at an act 602. To identify the user activity at the act 602, the identifier embedding system 104 can receive, from a client device associated with the user account, an indication of user input with regard to the first digital content item accessible by the user account. The indication of the user input may include a data packet with raw event data about an interaction or act performed with respect to the first digital content item. Additionally or alternatively, the data packet may include computer-executable instructions (e.g., a digital request) for the content management system 103 to perform some content management task (e.g., sync the first digital content item, share the first digital content item, etc.).

At an act 604, the identifier embedding system 104 identifies a first identifier 606 for the first digital content item. For example, the identifier embedding system 104 may extract the name, tag, title, classification, or other identifying element of the first digital content item. In particular embodiments, the identifier embedding system 104 extracts the filename, folder name, or workspace name corresponding to the first digital content item.

Additionally at the act 604, the identifier embedding system 104 identifies a second identifier 608 for a second digital content item. In some embodiments, the second digital content item is based on recent user activity. For example, the identifier embedding system 104 may use the second digital content item from one or more digital content items that a user account has accessed, modified, or shared within a threshold time period (e.g., one hour, twelve hours, a day, three days, a week, a month, etc.). In other embodiments, the identifier embedding system 104 uses the second digital content item from one or more digital content items that are assigned to a particular folder, a group of folders (e.g., favorited folders), or a workspace.

Based on the first identifier 606 and the second identifier 608, the identifier embedding system 104 utilizes the character-level embedding machine-learning model 306 and the word-level embedding machine-learning model 318 of the embedding machine-learning model 302c to process the first identifier 606 and the second identifier 608. In particular, the character-level embedding machine-learning model 306 generates a first character embedding 610 for the first identifier 606 and a second character embedding 612 for the second identifier 608 (e.g., as described above in relation to FIG. 3A). Similarly, the word-level embedding machine-learning model 318 generates a first token embedding 614 for the first identifier 606 and a second token embedding 616 for the second identifier 608 (e.g., as described above in relation to FIG. 3B). Subsequently, the embedding machine-learning model 302c generates a first identifier embedding 618 for the first identifier 606 by combining the first character embedding 610 and the first token embedding 614 (e.g., as described above in relation to FIG. 3C). Likewise, the embedding machine-learning model 302c generates a second identifier embedding 620 for the second identifier 608 by combining the second character embedding 612 and the second token embedding 616.

FIG. 6A therefore shows that the identifier embedding system 104 generates the first identifier embedding 618 and the second identifier embedding 620 in response to detecting user activity with respect to the first digital content item at act 602. In other embodiments, the identifier embedding system 104 generates the first identifier embedding 618 and the second identifier embedding 620 for storing in a batch prediction database 621 prior to detecting user activity with respect to a digital content item at act 602. For example, in certain embodiments the identifier embedding system 104 generates a batch prediction of identifier embeddings. Under this approach, the identifier embedding system 104 can later access the batch prediction database 621 for a variety of purposes (e.g., to update training data, to apply input features to a content management model as described below in FIG. 6B, etc.). In some cases, this approach is also computationally advantageous for implementing the acts and algorithms of FIG. 6B more quickly (e.g., in response to real-time detected user activity). To illustrate, the identifier embedding system 104 can provide a gain in processing speed by extracting or querying identifier embeddings pre-emptively generated and stored in the batch prediction database 621 rather than reactively generating the identifier embeddings.

With respect to FIG. 6B, the identifier embedding system 104 generates features for digital content items. Based on these input features, the content management model 214 determines digital connections between digital content items for generating one or more corresponding suggestions.

Indeed, as shown in FIG. 6B, the identifier embedding system 104 performs a series of acts to generate suggestions based on digital connections determined between digital content items. As shown, at an act 622, the identifier embedding system 104 generates one or more features as inputs to the content management model 214. These input features may include identifier embeddings (e.g., the first identifier embedding 618 and the second identifier embedding 620 as discussed above), file extension embeddings 624, user activity embeddings 626, and context data embeddings 628.

As used herein, a "file extension embedding" refers to one or more numerical representations (e.g., feature vectors) that represent a file extension (e.g., a group of letters occurring after a period in a filename to indicate a format of a file, a type of file, etc.). Thus, in some embodiments, the file extension embeddings 624 includes various feature vectors or numerical representations that represent respective file extensions corresponding to digital content items (e.g., the first and second digital content items identified above). To generate the file extension embeddings 624, the identifier embedding system 104 may retrieve pre-learned or pre-generated file extension embeddings that correspond to certain file extensions as described in U.S. patent application Ser. No. 16/675,671 entitled CONTENT TYPE EMBEDDINGS filed on DATE (hereafter "Content Type Embeddings"), which claims the benefit of U.S. Provisional Application No. 62/904,677 filed on Sep. 23, 2019. The contents of the foregoing patent applications are expressly incorporated herein by reference. Additionally or alternatively, the identifier embedding system 104 may generate encodings for certain file extensions of the digital content by using a generative model to determine a content type semantic similarity based on co-occurrence data as described in Content Type Embeddings.

Additionally, as used herein, a "user activity embedding" refers to one or more numerical representations (e.g., feature vectors) of user activity. The term "user activity" refers to a digital act performed by a computing device in response to user interaction. In particular, user activity can include user action taken with respect to a digital content item associated with a user's account and/or a group of user accounts. For example, user activity may include a client device accessing a digital content item in a content management system. Examples of user activity include computer-executable operations to select, open, add, edit, delete, move, share/unshare, sync/unsync, search for, rename, send or receive an invite to access, restore, comment, reply to a comment, resolve/unresolve a comment, mention a user account, change access privileges, enable/disable commenting or editing, etc. with respect to a digital content item.

Accordingly, the user activity embeddings 626 may include one or more feature vectors or numerical representations that represent aspects of user activity with respect to one or more of the digital content items (e.g., the first and second digital content items discussed above). In these or other embodiments, the user activity may include access patterns of a user account with respect to one or more digital content items. Additionally or alternatively, the user activity may include access patterns for a team of user accounts with respect to one or more digital content items mutually accessible by each user account of the team of user accounts. To generate the user activity embeddings 626, the identifier embedding system 104 may perform one or more acts to extract raw event data associated with user activity to determine user activity features, generate a feature vector embedding for each user activity feature, combine feature vector embeddings to generate an activity event vector, and/or hash the activity event vector. These and other acts associated with generating the user activity embeddings 626 are described in U.S. patent application Ser. No. 17/065,266 entitled UTILIZING A NATURAL LANGUAGE MODEL TO DETERMINE A PREDICTED ACTIVITY EVENT BASED ON A SERIES OF SEQUENTIAL TOKENS filed on Oct. 7, 2020, the contents of which are expressly incorporated herein by reference.

The context data embeddings 628 may include one or more feature vectors or numerical representations that represent aspects of various context relating to one or more of the digital content items (e.g., the first and second digital content items discussed above). For instance, such context may include metadata, authorship, creation date, last modification date, text-file content, image-file content, etc. In one particular example, the context data embeddings 628 may include folder path embeddings. In this example, the folder path embeddings can provide information signals that represent where the content management system 103 stores the digital content items. To generate the folder path embeddings, the identifier embedding system 104 may encode a sequence of folder levels within a directory tree/storage hierarchy of the content management system 103. For instance, the identifier embedding system 104 may assign numerical values (or unique combinations of numerical values) to one or more folder levels of the directory tree/storage hierarchy of the content management system 103. Based on a folder path to arrive at the storage location of a digital content item, the identifier embedding system 104 can then generate a vector series of encoded values for the folder path that correspond to the digital content item.

At an act 630, the identifier embedding system 104 uses the content management model 214 to process one or more of the input features generated at the act 622 to determine digital connections between digital content items (e.g., the first and second digital content items discussed above). Based on the digital connections, the identifier embedding system 104 generates one or more corresponding suggestions at an act 632. Because acts 630-632 are implementation-specific, the following description provides examples of these acts in relation to certain embodiments.

In some embodiments, the content management model 214 comprises a content suggestion model. Accordingly, at the act 630, the content suggestion model may determine a digital connection between the first and second digital content items by processing the first identifier embedding 618 and the second identifier embedding 620. For example, the content suggestion model may compare the first identifier embedding 618 and the second identifier embedding 620 using a comparison model (such as cosine similarity or another similarity measure). Based on the cosine similarity, the content suggestion model can determine a digital connection that indicates how similar the first and second digital content items are. In addition, the content suggestion model can repeat this process for many different digital content items. Then, at the act 632, the identifier embedding system 104 generates one or more suggestions with respect to digital content item(s) that correspond to a digital connection associated with a best or highest cosine similarity score (e.g., the digital content items with the one or two highest similarity scores).

In one or more embodiments the identifier embedding system 104 utilize a content suggestion machine-learning model (e.g., a convolutional neural network). For example, at the act 630, the content suggestion machine-learning model may process the first identifier embedding 618 and the second identifier embedding 620 to generate a predicted digital connection between the first and second digital content items. In turn, the identifier embedding system 104 can generate a similar prediction for a variety of digital content items. The identifier embedding system 104 can then compare predicted digital connections based on probability scores, confidence levels, etc. Then, at the act 632, the identifier embedding system 104 generates one or more suggestions with respect to digital content item(s) that correspond to predicted digital connections associated with the highest probability scores or confidence levels.

Further, in some embodiments, the identifier embedding system 104 analyzes multiple inputs to determine a digital connection between digital content items. For example, at the act 630, the content suggestion machine-learning model processes the first identifier embedding 618, the second identifier embedding 620, and at least one other embeddings for the first and second digital content items. To illustrate, the content suggestion machine-learning model may additionally analyze at least one other pair of embeddings for the first and second digital content items from the file extension embeddings 624, the user activity embeddings 626, or the context data embeddings 628. Then, in a similar manner just described, the identifier embedding system 104 can generate additional predictions for a variety of digital content items. In turn, at the act 632, the identifier embedding system 104 can generate one or more suggestions with respect to digital content item(s) that correspond to predicted digital connections associated with the highest probability scores or confidence levels.

Still, in other embodiments, the identifier embedding system 104 analyzes multiple inputs for determining multiple digital connections between digital content items. For example, at the act 630, the content suggestion machine-learning model processes the first identifier embedding 618, the second identifier embedding 620, and one or more of the file extension embeddings 624, the user activity embeddings 626, or the context data embeddings 628. For example, based on the processing, the content suggestion model may predict that the first and second digital content items are related by a digital connection, such as a parent-child file relation, a content-based similarity, a correlation based on user activity, an association based on access privileges, etc.

In these or other embodiments, the content suggestion model predicts one or more digital connections between the first and second digital content items by scoring or weighting multiple digital connection predictions. For instance, the content suggestion model may score a file relation prediction, a content-based similarity prediction, a user activity correlation, etc. In turn, the content suggestion model may determine that the digital connection(s) between digital content items correspond to the digital connection predictions that satisfy a score threshold. Those digital connection predictions which fail to satisfy the score threshold may not constitute a digital connection.

Figure 7A:
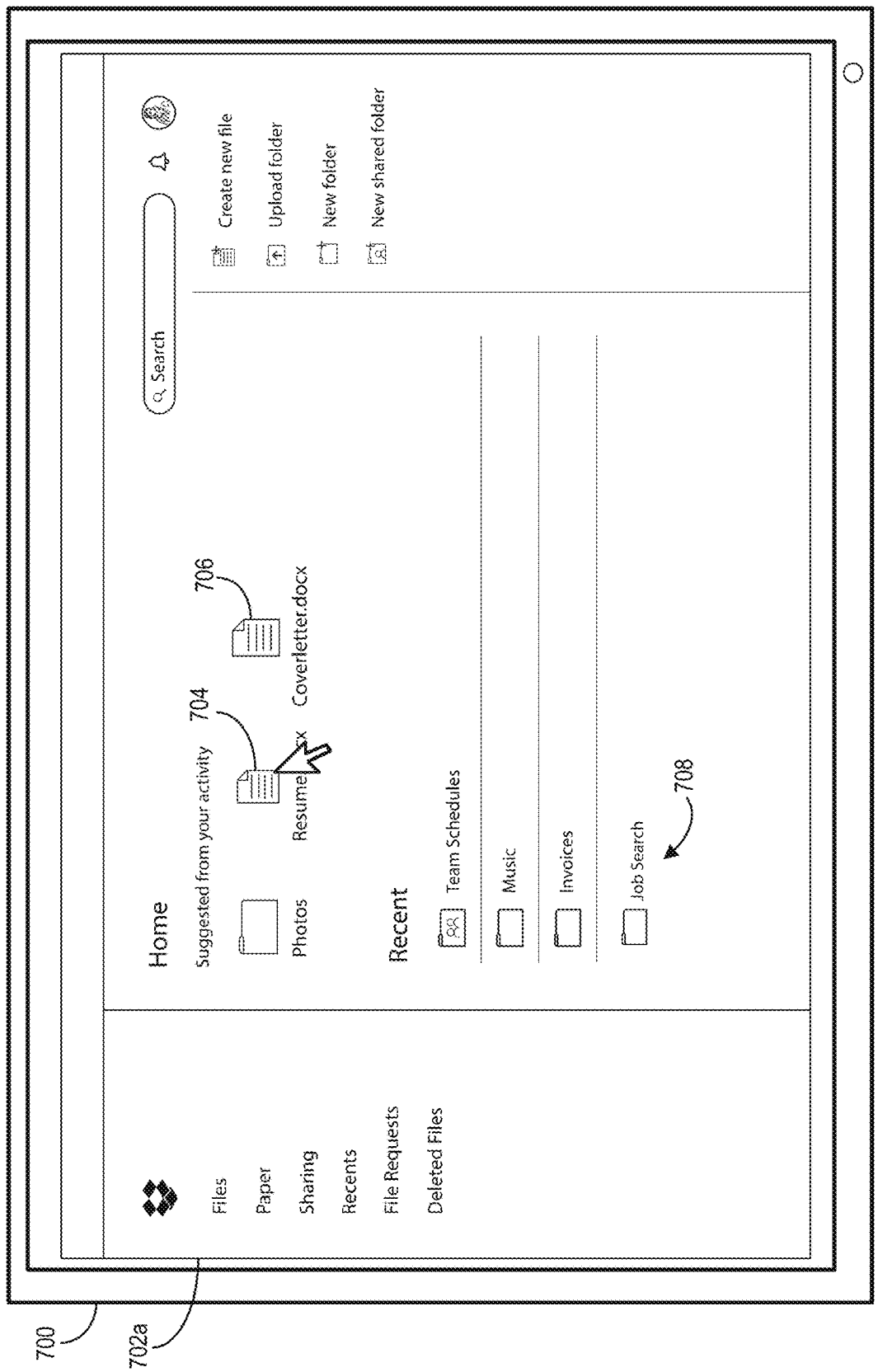
FIGS. 7A-7B illustrate an identifier embedding system providing user interfaces on a computing device in accordance with one or more embodiments.
Figure 7B:
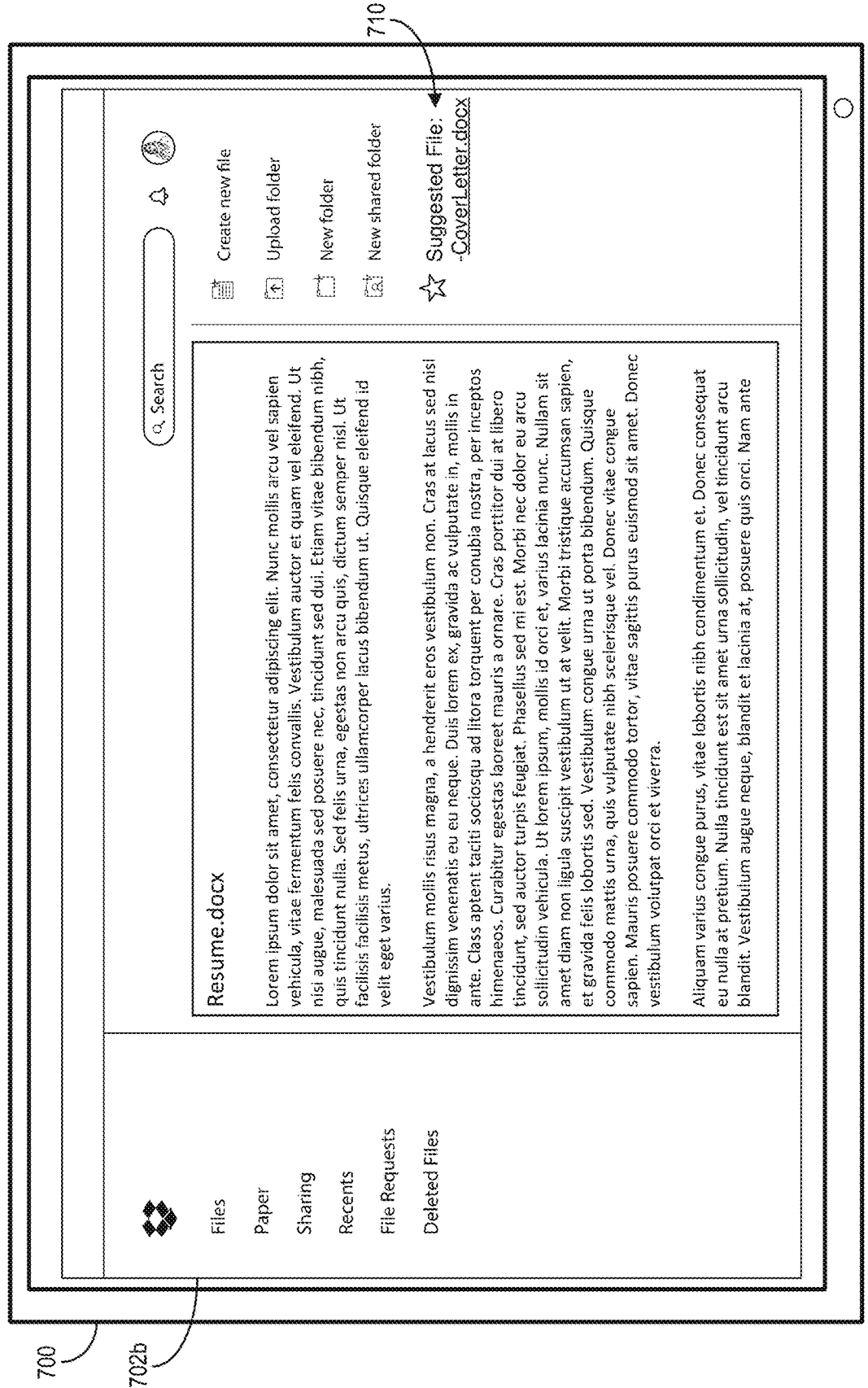

Furthermore, at the act 632, the identifier embedding system 104 may generate one or more suggestions based on the multiple digital connection predictions discussed above. In some embodiments, the content suggestion model uses the digital connections predictions to selectively (e.g., intelligently) generate suggestions for surfacing to a user account. For example, in some embodiments, the identifier embedding system 104 selects one of the multiple digital connections associated with a highest prediction score. In turn, the identifier embedding system 104 can present one or more suggestions for display within a user interface (e.g., as shown in FIG. 7B) that corresponds to the selected digital connection.

As another example, the identifier embedding system 104 may select two or more of the multiple digital connections that are associated with the highest prediction scores (e.g., the top three digital connections). In turn, the identifier embedding system 104 can present suggestions for display within the user interface that correspond to the selected digital connections. In yet another example, the identifier embedding system 104 may select only the digital connection associated with prediction scores that satisfy (e.g., meet or exceed) a threshold prediction score. Additionally or alternatively, the identifier embedding system 104 may filter out the digital connections associated with prediction scores that fall within a predetermined range or otherwise fail to satisfy a threshold prediction score.

In an additional example, the identifier embedding system 104 utilizes multiple digital connections to generate suggestions for display in a prioritized manner based on learned parameters and the digital connection prediction scores. For instance, the content suggestion model may weight or prioritize generating a first suggestion to open a recently accessed digital content item over generating a second suggestion to share a digital content item. In another example, the content suggestion model may weight or prioritize generating both the first suggestion and the second suggestion based on the learned parameters and the digital connection prediction scores.

As discussed above, the content management model 214 can determine a variety of digital connections between digital content items. In these or other embodiments, the identifier embedding system 104 can also train the content management model 214 to generate a variety of different suggestions according to a desired application. For example, the identifier embedding system 104 can train the content management model 214 to predict access privileges to grant or deny based on one or more of the embeddings discussed above. To illustrate, the identifier embedding system 104 can train the content management model 214 to learn from the first identifier embedding 618 and the second identifier embedding 620 that the first and second digital content items are similar and therefore a user should have access to similar files. Additionally or alternatively, the identifier embedding system 104 can train the content management model 214 to learn from the user activity embeddings 626 that certain users have similar user account activity and should therefore be granted the same access privileges.

Similarly, with respect to a suggested digital content item, the identifier embedding system 104 may generate a suggestion that prompts a user account to open or modify a digital content item. For example, the identifier embedding system 104 may train the content management model to learn from the first identifier embedding 618 and the second identifier embedding 620 that the first and second digital content items are similar and therefore a user should be prompted to open the second digital content item. Additionally or alternatively, the identifier embedding system 104 can train the content management model 214 to learn from the user activity embeddings 626 that a user typically opens both the first digital content item and the second digital content item. In this case, the content management model 214 can learn to prompt the user to open the second digital content item in response to the user activity embeddings 626 indicating the user has opened the first digital content item.

Further, in some embodiments, the identifier embedding system 104 trains the content management model 214 as a suggested destinations model. In these or other embodiments, the identifier embedding system 104 can train the content management model 214 to learn from the first identifier embedding 618 and the second identifier embedding 620 that the first and second digital content items are similar and therefore should be saved in a same folder or workspace. Similarly, the identifier embedding system 104 may train the content management model 214 to learn from the file extension embeddings 624 that the first and second digital content items are a same type of document (e.g., a PowerPoint® document) and should therefore be saved in a PowerPoint® folder.

To illustrate, at the act 632, the identifier embedding system 104 may generate one or more suggestions that comprise predicted destinations for saving (e.g., moving or storing) a digital content item. For instance, based on the predicted digital connections, the suggested destinations model may generate a ranked or ordered listing of suggested destinations. In this example, the suggested destinations model may prioritize the suggested destinations within the ordered listing such that suggested destinations that correspond to stronger (e.g., higher scoring) digital connections appear first.

In yet another example, the content management model 214 may include a filename recovery model as a way to remedy deleted characters in a filename (or other identifier). In this example, the filename recovery model may generate lost filenames by analyzing one or more embedding discussed above.

As shown in FIG. 6B and described above, the content management model 214 can include a machine-learning model. In at least some embodiments, however, the content management model 214 includes other computational models that are not necessarily a machine-learning model. For example, the content management model 214 may include a comparison model that performs one or both of the acts 630-632. Indeed, as discussed above, the comparison model may determine a cosine similarity between the first identifier embedding 618 and the second identifier embedding 620 for the respective first and second digital content items. Additionally, the comparison model may determine a cosine similarity between a pair of encodings for the context data embeddings 628 (e.g., a first and second folder path encoding) that correspond to the respective first and second digital content items.

Based on one or both of the cosine similarities, the comparison model can determine a measure of similarity (e.g., a relatedness) between the first and second digital content items. In addition, the identifier embedding system 104 can repeat the foregoing approach to determine a measure of similarity between a plurality of digital content items. In turn, the identifier embedding system 104 can suggest a top one or two digital content items that correspond to the highest measure of similarities among the plurality of digital content items. In other embodiments, the identifier embedding system 104 may limit suggestions for digital content items based on a threshold similarity. For example, if the measure of similarity satisfies a threshold similarity, the identifier embedding system 104 may generate one or more suggestions in a same or similar manner as described above. Otherwise, the identifier embedding system 104 may exclude suggestions for digital content items that do not satisfy the threshold similarity.

Although not illustrated with respect to FIG. 6B, one or more embodiments of the identifier embedding system 104 train the content management model 214 depending on the desired application. For example, in some embodiments, the identifier embedding system 104 trains the content management model 214 to predict a file that a user may open. In this example, the identifier embedding system 104 obtains training digital content items and associated ground truth data (e.g., observed instances of a user opening or not opening the training digital content items). In turn, the content management model 214 processes the training digital content items to predict respective likelihoods that a user will open training digital content items. The identifier embedding system 104 can then compare the predicted respective likelihoods of opening the training digital content items with the ground truth data utilizing a loss function. Based on the loss function, the identifier embedding system 104 can update one or more parameters of the content management model 214. By updating the parameters, the identifier embedding system 104 can narrow the difference in future training iterations between the predicted respective likelihoods of opening the training digital content items and the ground truth data.

As discussed above, the identifier embedding system 104 can train the content management model 214 to perform a variety of different functions as desired. For example, in some embodiments, the identifier embedding system 104 trains the content management model 214 to predict a destination where a user may save a digital content item (e.g., based on ground truth data of observed destinations where users actually saved the training digital content items). Indeed, the identifier embedding system 104 can train the content management model to generate a variety of predictions, including those already discussed in the previous description.

As just discussed, the identifier embedding system 104 can generate one or more suggestions for surfacing to a user account in response to detecting user activity with respect to a digital content item. FIGS. 7A-7B illustrate the identifier embedding system 104 providing user interfaces 702a-702b on a computing device 700 in accordance with one or more embodiments. As shown in FIG. 7A, the user interface 702a comprises digital content items 704-708. Via user input, a user account of the content management system 103 can access the digital content items 704-708 (in addition to other digital content items).

In response to user input at the digital content item 704 in FIG. 7A, FIG. 7B shows the identifier embedding system 104 providing the user interface 702b comprising an opened version of the digital content item 704 for viewing and/or modifying. Additionally shown, the user interface 702b comprises a suggestion 710. In particular, the suggestion 710 includes a link to open the digital content item 706 with a corresponding identifier of "Coverletter."

Moreover, the identifier embedding system 104 generates and surfaces the suggestion 710 shown in FIG. 7B based on various acts described above in relation to the foregoing figures. For example, in response to detecting the user input with respect to the digital content item 704 as shown in FIG. 7A, the identifier embedding system 104 may identify corresponding identifiers for the digital content item 704 (i.e., "Resume"), the digital content item 706 (i.e., "Coverletter"), the digital content item 708 (i.e., "Job Search"), and other digital content items.

With the identifiers for the digital content items 704-708 (and others), the identifier embedding system 104 can use an embedding machine-learning model (e.g., the embedding machine-learning model 302c) to generate corresponding identifier embeddings. That is, the identifier embedding system 104 can generate a first identifier embedding corresponding to the digital content item 704, a second identifier embedding corresponding to the digital content item 706, a third identifier embedding corresponding to the digital content item 708, and so forth. In like manner, the identifier embedding system 104 may generate one or more of file extension embeddings, user activity embeddings, or context data embeddings.

Subsequently, the identifier embedding system 104 can process the various embeddings at the content management model 214 to determine digital connections. For example, based on the processing, the identifier embedding system 104 may determine various digital connections between the digital content item 704 and the digital content item 706, between the digital content item 704 and the digital content item 708, and between the digital content item 704 and other digital content items.

With respect to the digital content item 704 and the digital content item 706, the content management model 214 may determine an access pattern connection exists (e.g., based on recent user activity and/or a frequency of user activity). Similarly, the content management model 214 may determine a file relation connection exists (e.g., based on the digital content item 704 and the digital content item 706 being sibling files within the parent file corresponding to the digital content item 708).

Based on these and/or other digital connections between the digital content item 704 and the digital content item 706, the identifier embedding system 104 chooses to provide the suggestion 710 for display as shown in FIG. 7B. In other embodiments, numerous other suggestions may apply as described above in relation to the foregoing figures. For example, the suggestion 710 may suggest that user account share the digital content item 704 with another user account.

Figure 8:
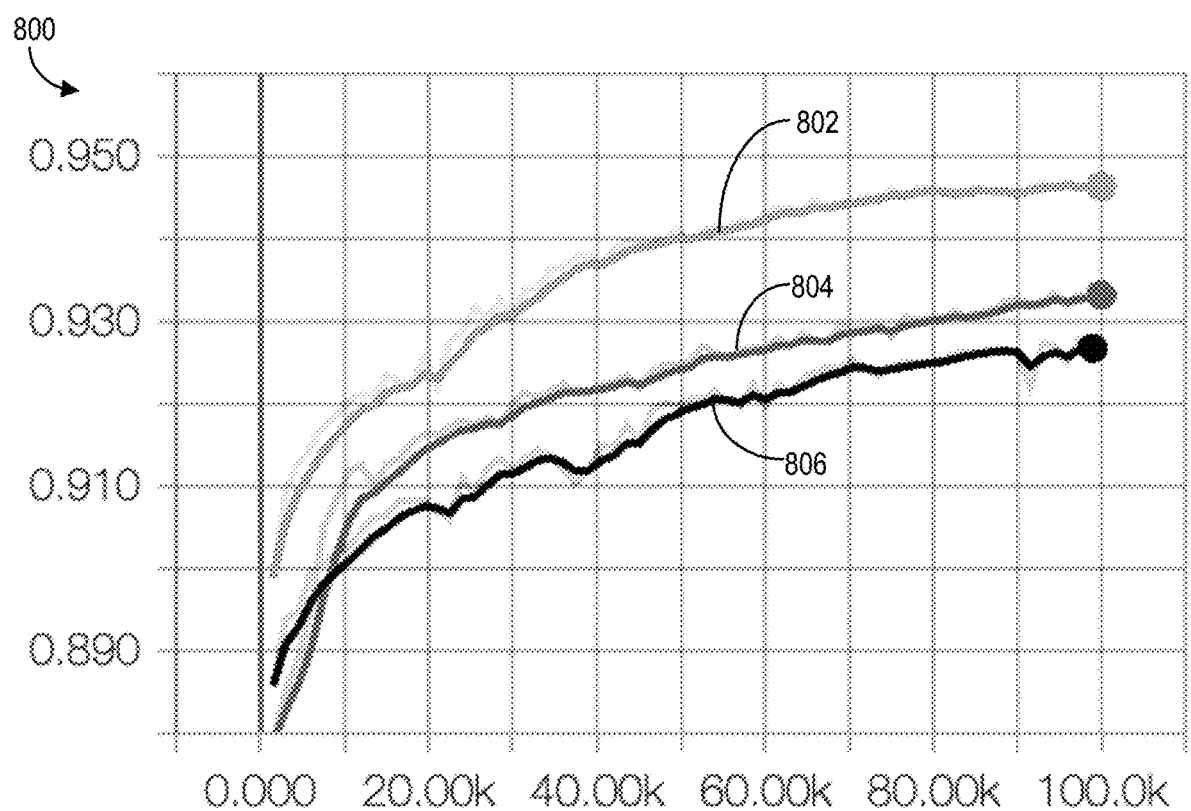
FIG. 8 illustrates experimental results for implementing an identifier embedding system in accordance with one or more embodiments.

As mentioned above, the identifier embedding system 104 provides a number of technical advantages over conventional systems. FIG. 8 illustrates a graph 800 reflecting experimental results for implementing the identifier embedding system 104 in accordance with one or more embodiments. In particular, the graph 800 indicates the accuracy (Y-axis) of utilizing the content management model 214 to determine digital connections (e.g., file relations) between digital content items. Lines 802-806 correspond to accuracy of digital connections as a function of training time/data (X-axis) when using identifier embeddings from the various embedding machine-learning models (e.g., the embedding machine-learning models 302a-302c).

Specifically, the line 802 corresponds to accuracy of digital connections when the identifier embedding system 104 causes the content management model 214 to use identifier embeddings from the embedding machine-learning model 302c. In addition, the line 804 corresponds to accuracy of digital connections when the identifier embedding system 104 causes the content management model 214 to use identifier embeddings from the embedding machine-learning model 302a. Further, the line 806 corresponds to accuracy of digital connections when the identifier embedding system 104 causes the content management model 214 to use identifier embeddings from the embedding machine-learning model 302b. Thus, the line 802 shows that utilizing identifier embeddings that account for both character embeddings and token embeddings from the embedding machine-learning model 302c improves accuracy. Indeed, the line 802 shows that utilizing identifier embeddings that account for both character embeddings and token embeddings can provide an approximate 1.5% and 2% accuracy improvement over the other approaches corresponding to respective lines 804, 806.

In some embodiments, additional experimental results (not shown in FIG. 8) indicate that the identifier embedding system 104 can also provide a pairwise accuracy of 0.9548 when utilizing identifier embeddings from the embedding machine-learning model 302a and 302c. In these experimental results, the identifier embedding system 104 can also provide precision recall area under curve (PR-AUC) scores of 0.9455 and 0.9531 when utilizing identifier embeddings from the embedding machine-learning model 302a and 302c, respectively. In addition, the identifier embedding system 104 can also provide a receiver operating characteristic area under curve (ROC-AUC) scores of 0.9500 and 0.9372 when utilizing identifier embeddings from the embedding machine-learning model 302a and 302c, respectively.

Figure 9:
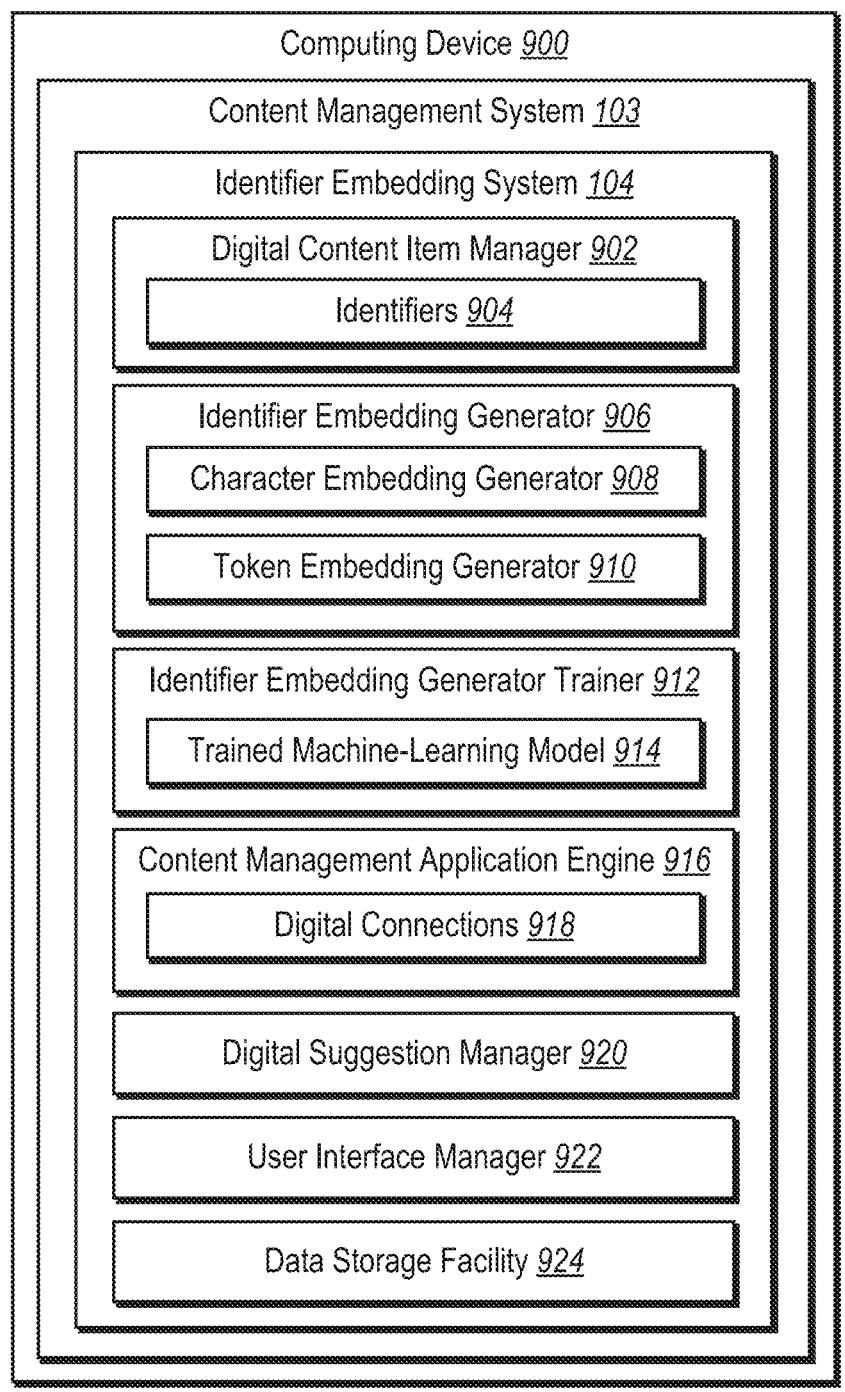
FIG. 9 illustrates an example schematic diagram of an identifier embedding system in accordance with one or more embodiments.

Turning to FIG. 9, additional detail will now be provided regarding various components and capabilities of the identifier embedding system 104. In particular, FIG. 9 illustrates an example schematic diagram of a computing device 900 (e.g., the server(s) 102, the client devices 106, and/or the computing device 700) implementing the identifier embedding system 104 in accordance with one or more embodiments of the present disclosure. As shown, the identifier embedding system 104 is further implemented by the server (s) 102 and the content management system 103. Also illustrated, the identifier embedding system 104 can include a digital content item manager 902, an identifier embedding generator 906, an identifier embedding generator trainer 912, a content management application engine 916, a digital suggestion manager 920, a user interface manager 922, and a data storage facility 924.

The digital content item manager 902 can identify, store, transmit, access, and/or modify digital content items. In particular, the digital content item manager 902 can identify the identifiers 904 of digital content items (as described in relation to the foregoing figures). For example, the digital content item manager 902 can identify a first digital content item corresponding to detected user activity for a user account and a second digital content item that the user account recently accessed.

Based on the identifiers 904 from the digital content item manager 902, the identifier embedding generator 906 can generate identifier embeddings (as described in relation to the foregoing figures). In particular, the identifier embedding generator 906 can use one or both of the character embedding generator 908 or the token embedding generator 910 to generate an identifier embedding. For example, the character embedding generator 908 generates character embeddings for the identifiers 904, and the token embedding generator 910 generates corresponding token embeddings. Based on a combination of the character embeddings and the token embeddings, the identifier embedding generator 906 generates identifier embeddings for providing to the content management application engine 916.

The identifier embedding generator trainer 912 can train the identifier embedding generator 906 as an embedding machine-learning model to generate identifier embeddings (as described in relation to the foregoing figures). In particular, the identifier embedding generator trainer 912 includes a trained machine-learning model 914 that generates digital similarity predictions for comparing against ground truth similarity metrics. Using a loss function to compare the digital similarity predictions (e.g., file relation predictions) and the ground truth similarity metrics (e.g., actual file relations), the identifier embedding generator trainer 912 can generate a loss for updating one or more parameters at the identifier embedding generator 906.

The content management application engine 916 can use the identifier embeddings from the identifier embedding generator 906 to determine or predict digital connections 918 that reflect how digital content items are related (as described in relation to the foregoing figures). In particular, the content management application engine 916 may include a machine-learning model that uses input features, such as the identifier embeddings from the identifier embedding generator 906, file extension embeddings, user activity embeddings, context data embeddings etc. For example, the content management application engine 916 may include a content suggestion model, a suggested destinations model, or a filename recovery model. In other embodiments, the content management application engine 916 is a comparison model (e.g., that determines a cosine similarity between identifier embeddings and/or other embeddings). In some cases, to determine predict the digital connections 918, the content management application engine 916 generates digital connection prediction scores that the digital suggestion manager 920 can use to score, weight, and/or prioritize suggestions.

Based on the digital connections 918 from the content management application engine 916, the digital suggestion manager 920 can generate one or more corresponding suggestions for providing to a user interface of client device associated with a user account of the content management system 103. In particular, the digital suggestion manager 920 can use digital connection prediction scores and/or learned parameters from the content management application engine 916 to score, provide, weight, and/or prioritize suggestions. For example, the digital suggestion manager 920 may generate a suggestion corresponding to a most similar digital content item (e.g., with a highest digital connection prediction score). In yet another example, the digital suggestion manager 920 may generate multiple suggestions for a top two or top three digital content items corresponding to the top two or three highest digital connection prediction scores.

The user interface manager 922 can provide, manage, and/or control a graphical user interface (or simply "user interface"). In particular, the user interface manager 922 may generate and display a user interface by way of a display screen composed of a plurality of graphical components, objects, and/or elements that allow a user to perform a function. For example, the user interface manager 922 can receive user inputs from a user, such as a click/tap to edit or share a digital content item. Additionally, the user interface manager 922 can present a variety of types of information, including text, digital media items, workspaces, search results, product recommendations, or other information.

The data storage facility 924 maintains data for the identifier embedding system 104. The data storage facility 924 (e.g., via one or more memory devices) can maintain data of any type, size, or kind, as necessary to perform the functions of the identifier embedding system 104. For example, the data storage facility 924 can include training data, identifier embeddings (e.g., as part of a batch prediction database), etc.

Each of the components of the computing device 900 can include software, hardware, or both. For example, the components of the computing device 900 can include one or more instructions stored on a computer-readable storage medium and executable by processors of one or more computing devices, such as a client device or server device. When executed by the one or more processors, the computer-executable instructions of the identifier embedding system 104 can cause the computing device(s) (e.g., the computing device 900) to perform the methods described herein. Alternatively, the components of the computing device 900 can include hardware, such as a special-purpose processing device to perform a certain function or group of functions. Alternatively, the components of the computing device 900 can include a combination of computer-executable instructions and hardware.

Furthermore, the components of the computing device 900 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 900 may be implemented as a stand-alone application, such as a desktop or mobile application. Furthermore, the components of the computing device 900 may be implemented as one or more web-based applications hosted on a remote server.

Figure 10A:
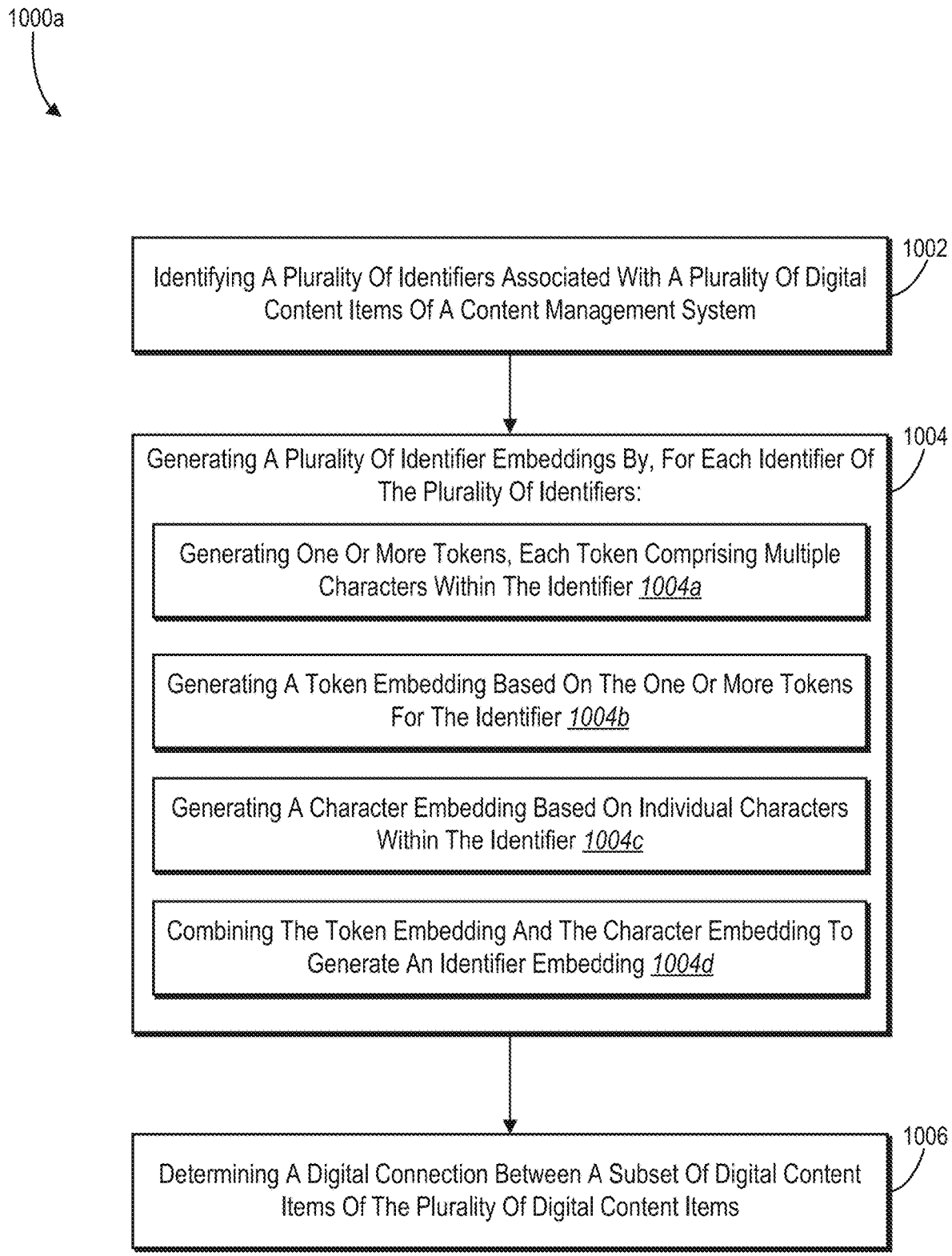
FIG. 10A illustrates a flowchart of a series of acts for determining a digital connection between a subset of digital content items in accordance with one or more embodiments.
Figure 10B:
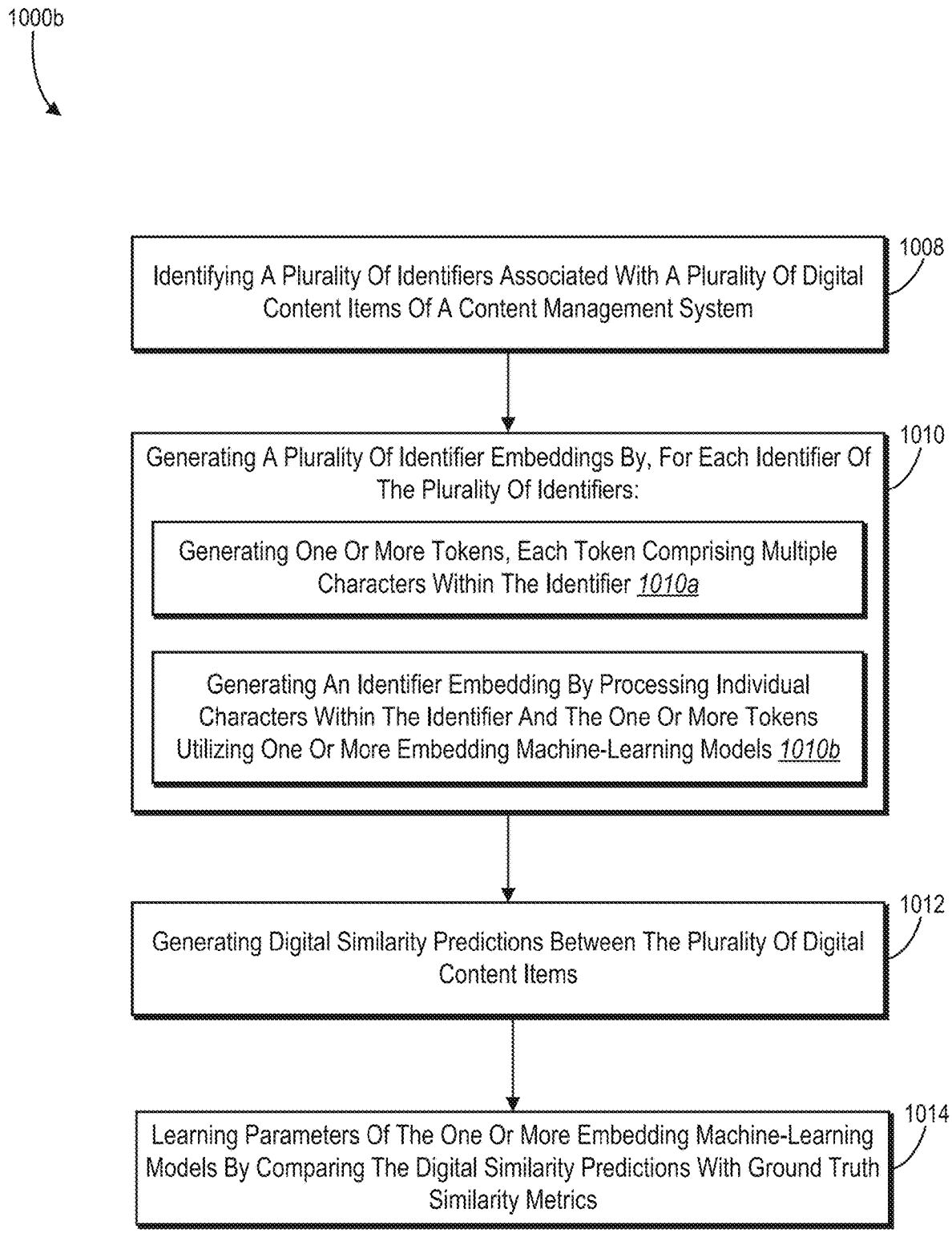
FIG. 10B illustrates a flowchart of a series of acts for learning parameters of one or more embedding machine-learning models in accordance with one or more embodiments.

FIGS. 1-9, the corresponding text, and the examples provide several different systems, methods, techniques, components, and/or devices of the identifier embedding system 104 in accordance with one or more embodiments. In addition to the above description, one or more embodiments can also be described in terms of flowcharts including acts for accomplishing a particular result. For example, FIG. 10A illustrates a flowchart of a series of acts 1000a for determining a digital connection between a subset of digital content items in accordance with one or more embodiments. In addition, FIG. 10B illustrates a flowchart of a series of acts 1000b for learning parameters of one or more embedding machine-learning models in accordance with one or more embodiments. The identifier embedding system 104 may perform one or more acts of the series of acts 1000a-1000b in addition to or alternatively to one or more acts described in conjunction with other figures. While FIGS. 10A-10B illustrate acts according to one embodiment, alternative embodiments may omit, add to, reorder, and/or modify any of the acts shown in FIGS. 10A-10B. The acts of FIGS. 10A-10B can be performed as part of a method. Alternatively, a non-transitory computer-readable medium can comprise instructions that, when executed by one or more processors, cause a computing device to perform the acts of FIGS. 10A-10B. In some embodiments, a system can perform the acts of FIGS. 10A-10B.

As shown, the series of acts 1000a includes an act 1002 of identifying a plurality of identifiers associated with a plurality of digital content items of a content management system.

The series of acts 1000a further includes an act 1004 of generating a plurality of identifier embeddings by performing acts 1004a-1004d for each identifier of the plurality of identifiers. For example, act 1004a includes generating one or more tokens, each token comprising multiple characters within the identifier. In some embodiments, generating the one or more tokens comprises utilizing lexical rules based on character casing and delimiters to group a subset of the individual characters within the identifier into one or more words.

In addition, act 1004b includes generating a token embedding based on the one or more tokens for the identifier. In some embodiments, generating the token embedding comprises processing the one or more tokens utilizing a word-level embedding machine-learning model. For example, generating the token embedding comprises processing the one or more tokens utilizing a first embedding layer and a first recurrent neural network of the word-level embedding machine-learning model.

Further, act 1004c includes generating a character embedding based on individual characters within the identifier. In some embodiments, generating the character embedding comprises processing the individual characters utilizing a character-level embedding machine-learning model. For example, generating the character embedding comprises processing the individual characters utilizing a second embedding layer and a second recurrent neural network of the character-level embedding machine-learning model. Additionally, act 1004d includes combining the token embedding and the character embedding to generate an identifier embedding.

In addition, the series of acts 1000a includes an act 1006 of determining a digital connection between a subset of digital content items of the plurality of digital content items by processing the plurality of identifier embeddings utilizing a content management model.

It is understood that the outlined acts in the series of acts 1000a are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 10A, act(s) in the series of acts 1000a may include: detecting user activity with respect to a first digital content item of the plurality of digital content items; generating the plurality of identifier embeddings by generating a first identifier embedding for the first digital content item and a second identifier embedding for a second digital content item; determining, utilizing the content management model, a digital connection between the first identifier embedding and the second identifier embedding; and based on the digital connection, generating one or more suggestions related to at least one of the first digital content item or the second digital content item.

As another example of an additional act not shown in FIG. 10A, act(s) in the series of acts 1000a may include generating, via the content management model and based on the digital connection between the subset of digital content items of the plurality of digital content items, one or more suggestions comprising at least one of a suggested team workspace, a suggested digital content item; or a suggested access privilege.

In yet another example of an additional act not shown in FIG. 10A, act(s) in the series of acts 1000a may include generating a plurality of training identifier embeddings by: generating a plurality of training character embeddings; generating a plurality of training token embeddings; and combining the plurality of training character embeddings and the plurality of training token embeddings.

As a further example of an additional act not shown in FIG. 10A, act(s) in the series of acts 1000a may include training the character-level embedding machine-learning model and the word-level embedding machine-learning model by: generating digital similarity predictions between a plurality of training digital content items by processing the plurality of training identifier embeddings utilizing a trained machine-learning model; and learning parameters of the character-level embedding machine-learning model and the word-level embedding machine-learning model by comparing the digital similarity predictions with ground truth similarity metrics.

With respect to FIG. 10B, the series of acts 1000b includes an act 1008 of identifying a plurality of identifiers associated with a plurality of digital content items of a content management system. Additionally, the series of acts 1000b includes an act 1010 of generating a plurality of identifier embeddings by performing acts 1010a-1010b for each identifier of the plurality of identifiers. For example, act 1010a includes generating one or more tokens, each token comprising multiple characters within the identifier. In addition, act 1010b includes generating an identifier embedding by processing individual characters within the identifier and the one or more tokens utilizing one or more embedding machine-learning models.

Further, the series of acts 1000b includes an act 1012 of generating digital similarity predictions between the plurality of digital content items by processing the plurality of identifier embeddings utilizing a trained machine-learning model. In some embodiments, generating the digital similarity predictions comprises utilizing the trained machine-learning model to generate a file relation prediction between the first identifier and the second identifier, the file relation prediction comprising at least one of a parent-child file relation prediction or a sibling file relation prediction.

In addition, the series of acts 1000b includes an act 1014 of learning parameters of the one or more embedding machine-learning models by comparing the digital similarity predictions with ground truth similarity metrics. In some embodiments, learning the parameters for the one or more embedding machine-learning model comprises: generating a first identifier embedding by combining a first token embedding and a first character embedding corresponding to a first identifier; generating a second identifier embedding by combining a second token embedding and a second character embedding corresponding to a second identifier; and generating a combined identifier embedding for the trained machine-learning model by combining the first identifier embedding and the second identifier embedding.

Additionally or alternatively, act 1014 comprises learning the parameters for the one or more embedding machine-learning model comprises: generating a digital similarity prediction between the first identifier and the second identifier by processing the combined identifier embedding utilizing the trained machine-learning model; and determining a loss by comparing the digital similarity prediction and a ground truth similarity metric utilizing a loss function.

It is understood that the outlined acts in the series of acts 1000b are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 10B, act(s) in the series of acts 1000b may include: detecting user activity with respect to a first digital content item; generating, utilizing the one or more embedding machine-learning models, a first identifier embedding for the first digital content item and a second identifier embedding for a second digital content item; and responsive to the user activity, generating one or more suggestions related to the second digital content item by processing the first identifier embedding and the second identifier embedding utilizing a content management model.

As another example of an additional act not shown in FIG. 10B, act(s) in the series of acts 1000b may include generating one or more suggestions utilizing a content management model by processing an identifier embedding corresponding to a digital content item and at least one of: a file extension embedding corresponding to the digital content item; or a user activity embedding corresponding to user activity with respect to the digital content item.

In yet another example of an additional act not shown in FIG. 10B, act(s) in the series of acts 1000b may include: identifying a plurality of training identifiers associated with a plurality of training digital content items of a content management system; identifying a plurality of ground truth file relations between the plurality of training digital content items; generating a plurality of identifier embeddings by processing the plurality of identifiers utilizing an embedding machine-learning model; generating a plurality of file relation predictions between the plurality of identifiers by processing the plurality of identifier embeddings utilizing a file relation machine-learning model, the plurality of file relation predictions comprising at least one of a parent-child file relation prediction or a sibling file relation prediction; and learning parameters of the embedding machine-learning model by comparing the plurality of file relation predictions and the plurality of file relations.

In an additional example of an additional act not shown in FIG. 10B, act(s) in the series of acts 1000b may include generating the plurality of identifier embeddings by generating, for each training identifier of the plurality of training identifiers, a plurality of identifier embeddings by: generating one or more tokens, each token comprising multiple characters within the training identifier; generating a token embedding based on the one or more tokens for the training identifier; generating a character embedding based on individual characters within the training identifier; and combining the token embedding and the character embedding to generate an identifier embedding.

In another example of an additional act not shown in FIG. 10B, act(s) in the series of acts 1000b may include generating the plurality of identifier embeddings by: generating the token embedding by processing the one or more tokens utilizing a word-level embedding machine-learning model; and generating the character embedding by processing the individual characters utilizing a character-level embedding machine-learning model.

In yet another example of an additional act not shown in FIG. 10B, act(s) in the series of acts 1000b may include: generating a combined identifier embedding by combining a first identifier embedding for a first training identifier and a second identifier embedding for a second training identifier; generating a file relation prediction between the first training identifier and the second training identifier by processing the combined identifier embedding utilizing the file relation machine-learning model; and learning the parameters of the embedding machine-learning model by determining a loss between the file relation prediction and a ground truth file relation of the plurality of ground truth file relations.

In a further example of an additional act not shown in FIG. 10B, act(s) in the series of acts 1000b may include generating the plurality of file relation predictions by: processing the combined identifier embedding utilizing one or more fully connected layers of the file relation machine-learning model; and generating a first file relation score for a parent-child file relation and a second file relation score for a sibling file relation. In these or other embodiments, generating the plurality of file relation predictions comprises generating a file relation prediction between the first identifier and the second identifier by comparing the first file relation score and the second file relation score.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
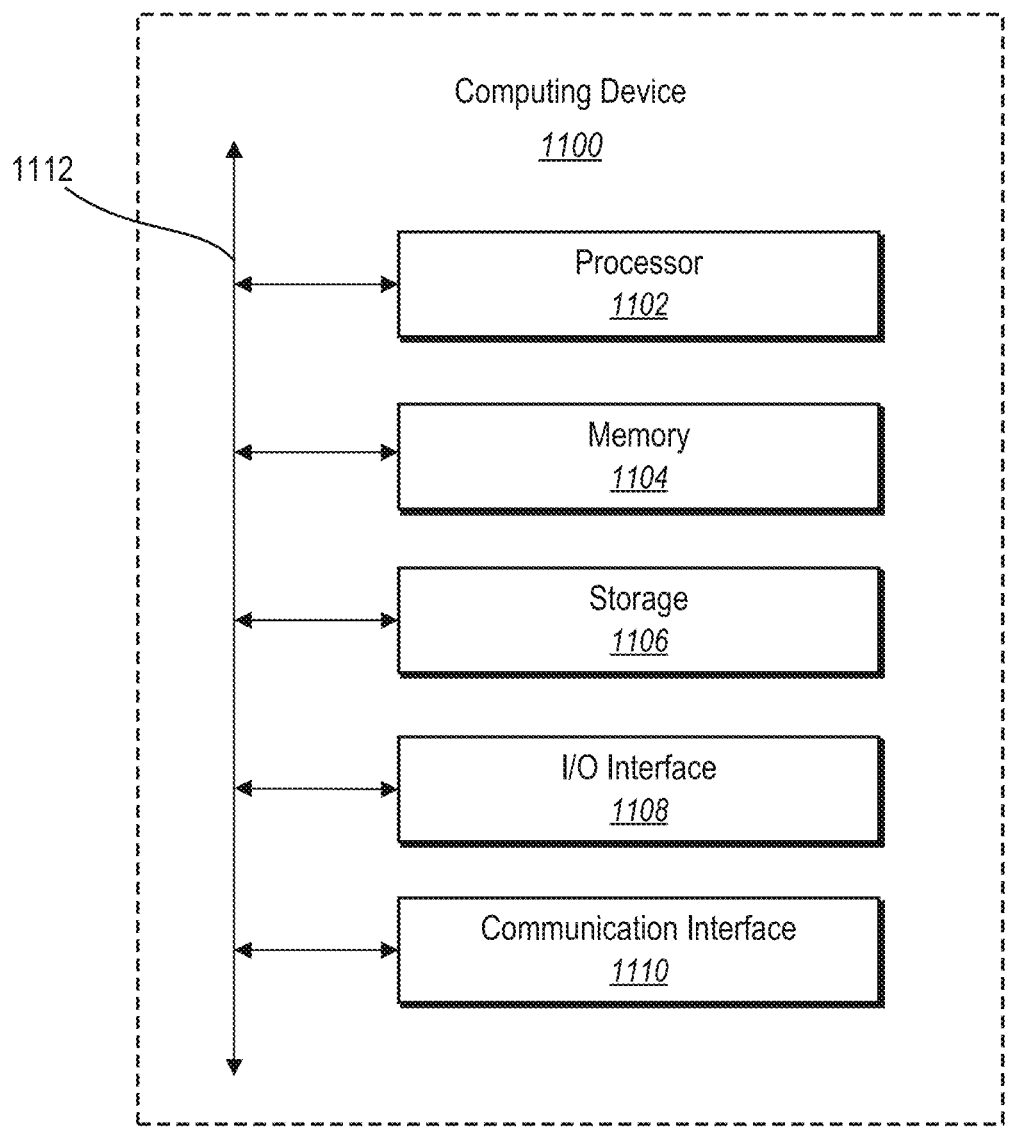
FIG. 11 illustrates a block diagram of an example computing device for implementing one or more embodiments of the present disclosure.

FIG. 11 illustrates a block diagram of exemplary computing device 1100 that may be configured to perform one or more of the processes described above. One will appreciate that client devices described herein and/or the content management system 103 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, computing device 1100 can include fewer components than those shown in FIG. 11. Components of computing device 1100 shown in FIG. 11 will now be described in additional detail.

In particular embodiments, processor 1102 includes hardware for executing instructions, such as those making up a computer program. As an example, and not by way of limitation, to execute instructions, processor 1102 may retrieve (or fetch) the instructions from an internal register, an internal cache, memory 1104, or storage device 1106 and decode and execute them. In particular embodiments, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or the storage device 1106. Additionally, processor 1102 can include or represent one or more processors or processor cores.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular embodiments, storage device 1106 is non-volatile, solid-state memory. In other embodiments, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
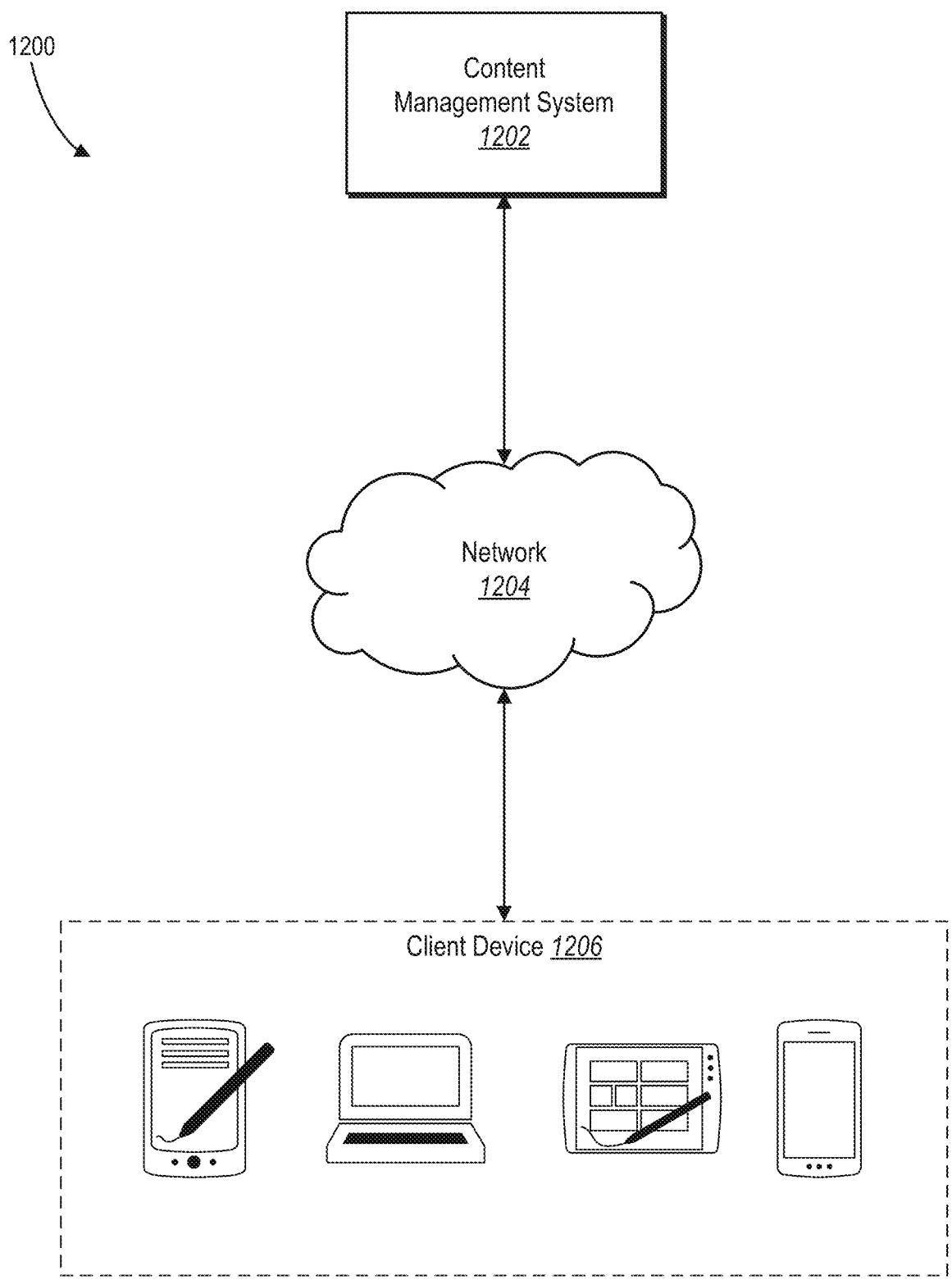
FIG. 12 illustrates a network environment of a content management system in accordance with one or more embodiments.

FIG. 12 is a schematic diagram illustrating an environment 1200 within which one or more embodiments of content management system 103 can be implemented. For example, as shown in FIG. 12, content management system 1202 (e.g., content management system 103) may generate, store, manage, receive, and send digital content (such as digital videos). For example, content management system 1202 may send and receive digital content to and from client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using client device 1206. The content management system 1202 can cause the client device 1206 to send the edited digital content to content management system 1202. Content management system 1202 then synchronizes the edited digital content on one or more additional computing devices.

In addition to synchronizing digital content across multiple devices, one or more embodiments of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access the content management system 1202.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   at least one non-transitory computer-readable storage medium storing instructions that, when executed by the at least one processor, cause the system to:
   identify a plurality of identifiers associated with a plurality of digital content items of a content management system;
   generate a plurality of identifier embeddings by, for each identifier of the plurality of identifiers:
   generating one or more tokens, each token comprising multiple characters within the identifier,
   generating a token embedding based on the one or more tokens for the identifier,
   generating a character embedding based on individual characters within the identifier, and
   combining the token embedding and the character embedding to generate an identifier embedding; and
   determine a digital connection between a subset of digital content items of the plurality of digital content items by processing the plurality of identifier embeddings utilizing a content management model.

2. The system of claim 1, further comprising instructions that, when executed by the at least one processor, cause the system to generate the one or more tokens by utilizing lexical rules based on character casing and delimiters to group a subset of the individual characters within the identifier into one or more words.

3. The system of claim 1, further comprising instructions that, when executed by the at least one processor, cause the system to:
   detect user activity with respect to a first digital content item of the plurality of digital content items;
   generate the plurality of identifier embeddings by generating a first identifier embedding for the first digital content item and a second identifier embedding for a second digital content item;
   determine, utilizing the content management model, a digital connection between the first identifier embedding and the second identifier embedding; and
   based on the digital connection, generate one or more suggestions related to at least one of the first digital content item or the second digital content item.

4. The system of claim 1, further comprising instructions that, when executed by the at least one processor, cause the system to generate, via the content management model and based on the digital connection between the subset of digital content items of the plurality of digital content items, one or more suggestions comprising at least one of a suggested team workspace, a suggested digital content item; or a suggested access privilege.

5. The system of claim 1, further comprising instructions that, when executed by the at least one processor, cause the system to:
   generate the token embedding by processing the one or more tokens utilizing a word-level embedding machine-learning model; and
   generate the character embedding by processing the individual characters utilizing a character-level embedding machine-learning model.

6. The system of claim 5, further comprising instructions that, when executed by the at least one processor, cause the system to:
   generate the token embedding by processing the one or more tokens utilizing a first embedding layer and a first recurrent neural network of the word-level embedding machine-learning model; and
   generate the character embedding by processing the individual characters utilizing a second embedding layer and a second recurrent neural network of the character-level embedding machine-learning model.

7. The system of claim 5, further comprising instructions that, when executed by the at least one processor, cause the system to generate a plurality of training identifier embeddings by:
   generating a plurality of training character embeddings;
   generating a plurality of training token embeddings; and
   combining the plurality of training character embeddings and the plurality of training token embeddings.

8. The system of claim 7, further comprising instructions that, when executed by the at least one processor, cause the system to train the character-level embedding machine-learning model and the word-level embedding machine-learning model by:
   generating digital similarity predictions between a plurality of training digital content items by processing the plurality of training identifier embeddings utilizing a trained machine-learning model; and
   learning parameters of the character-level embedding machine-learning model and the word-level embedding machine-learning model by comparing the digital similarity predictions with ground truth similarity metrics.

9. A system comprising:
   at least one processor; and
   at least one non-transitory computer-readable storage medium storing instructions that, when executed by the at least one processor, cause the system to:
   identify a plurality of identifiers associated with a plurality of digital content items of a content management system;
   generate a plurality of identifier embeddings by, for each identifier of the plurality of identifiers:
   generating one or more tokens, each token comprising multiple characters within the identifier, and
   generating an identifier embedding by processing individual characters within the identifier and the one or more tokens utilizing one or more embedding machine-learning models;
   generate digital similarity predictions between the plurality of digital content items by processing the plurality of identifier embeddings utilizing a trained machine-learning model; and learn parameters of the one or more embedding machine-learning models by comparing the digital similarity predictions with ground truth similarity metrics.

10. The system of claim 9, further comprising instructions that, when executed by the at least one processor, cause the system to learn the parameters for the one or more embedding machine-learning models by:
   generating a first identifier embedding by combining a first token embedding and a first character embedding corresponding to a first identifier;
   generating a second identifier embedding by combining a second token embedding and a second character embedding corresponding to a second identifier; and
   generating a combined identifier embedding for the trained machine-learning model by combining the first identifier embedding and the second identifier embedding.

11. The system of claim 10, further comprising instructions that, when executed by the at least one processor, cause the system to learn the parameters for the one or more embedding machine-learning models by:
   generating a digital similarity prediction between the first identifier and the second identifier by processing the combined identifier embedding utilizing the trained machine-learning model; and
   determining a loss by comparing the digital similarity prediction and a ground truth similarity metric utilizing a loss function.

12. The system of claim 10, further comprising instructions that, when executed by the at least one processor, cause the system to generate the digital similarity prediction by utilizing the trained machine-learning model to generate a file relation prediction between the first identifier and the second identifier, the file relation prediction comprising at least one of a parent-child file relation prediction or a sibling file relation prediction.

13. The system of claim 9, further comprising instructions that, when executed by the at least one processor, cause the system to:
   detect user activity with respect to a first digital content item;
   generate, utilizing the one or more embedding machine-learning models, a first identifier embedding for the first digital content item and a second identifier embedding for a second digital content item; and
   responsive to the user activity, generate one or more suggestions related to the second digital content item by processing the first identifier embedding and the second identifier embedding utilizing a content management model.

14. The system of claim 9, further comprising instructions that, when executed by the at least one processor, cause the system to generate one or more suggestions utilizing a content management model by processing an identifier embedding corresponding to a digital content item and at least one of:
   a file extension embedding corresponding to the digital content item; or
   a user activity embedding corresponding to user activity with respect to the digital content item.

15. A system comprising:
   at least one processor; and
   at least one non-transitory computer-readable storage medium storing instructions that, when executed by the at least one processor, cause the system to train an embedding machine-learning model by:
      identifying a plurality of training identifiers associated with a plurality of training digital content items of a content management system;
      identifying a plurality of ground truth file relations between the plurality of training digital content items;
      generating a plurality of identifier embeddings by processing the plurality of training identifiers utilizing the embedding machine-learning model;
      generating a plurality of file relation predictions between the plurality of training identifiers by processing the plurality of identifier embeddings utilizing a file relation machine-learning model, the plurality of file relation predictions comprising at least one of a parent-child file relation prediction or a sibling file relation prediction; and
      learning parameters of the embedding machine-learning model by comparing the plurality of file relation predictions and the plurality of ground truth file relations.

16. The system of claim 15, further comprising instructions that, when executed by the at least one processor, cause the system to generate the plurality of identifier embeddings by generating, for each training identifier of the plurality of training identifiers, a plurality of identifier embeddings by:
   generating one or more tokens, each token comprising multiple characters within the training identifier;
   generating a token embedding based on the one or more tokens for the training identifier;
   generating a character embedding based on individual characters within the training identifier; and
   combining the token embedding and the character embedding to generate an identifier embedding.

17. The system of claim 16, further comprising instructions that, when executed by the at least one processor, cause the system to generate the plurality of identifier embeddings by:
   generating the token embedding by processing the one or more tokens utilizing a word-level embedding machine-learning model; and
   generating the character embedding by processing the individual characters utilizing a character-level embedding machine-learning model.

18. The system of claim 15, further comprising instructions that, when executed by the at least one processor, cause the system to:
   generate a combined identifier embedding by combining a first identifier embedding for a first training identifier and a second identifier embedding for a second training identifier;
   generate a file relation prediction between the first training identifier and the second training identifier by processing the combined identifier embedding utilizing the file relation machine-learning model; and
   learn the parameters of the embedding machine-learning model by determining a loss between the file relation prediction and a ground truth file relation of the plurality of ground truth file relations.

19. The system of claim 18, further comprising instructions that, when executed by the at least one processor, cause the system to generate the plurality of file relation predictions by:
   processing the combined identifier embedding utilizing one or more fully connected layers of the file relation machine-learning model; and generating a first file relation score for a parent-child file relation and a second file relation score for a sibling file relation.

20. The system of claim 19, further comprising instructions that, when executed by the at least one processor, cause the system to generate the plurality of file relation predictions by generating a file relation prediction between the first identifier and the second identifier by comparing the first file relation score and the second file relation score.

* * * * *